US012528056B2

(12) United States Patent
Bhave et al.

(10) Patent No.: US 12,528,056 B2
(45) Date of Patent: Jan. 20, 2026

(54) LITHIUM EXTRACTION COMPOSITE FOR RECOVERY OF LITHIUM FROM BRINES, AND PROCESS OF USING SAID COMPOSITION

(71) Applicants: UT-Battelle, LLC, Oak Ridge, TN (US); All American Lithium LLC, Brawley, CA (US)

(72) Inventors: Ramesh R. Bhave, Knoxville, TN (US); Stephen Harrison, Benicia, CA (US); Bruce A. Moyer, Oak Ridge, TN (US); M. Parans Paranthaman, Knoxville, TN (US)

(73) Assignees: UT-Battelle, LLC, Oak Ridge, TN (US); All American Lithium LLC, Brawley, CA (US)

( * ) Notice: Subject to any disclaimer, the term of this patent is extended or adjusted under 35 U.S.C. 154(b) by 1047 days.

(21) Appl. No.: 17/572,773

(22) Filed: Jan. 11, 2022

(65) Prior Publication Data

US 2022/0134291 A1    May 5, 2022

Related U.S. Application Data

(63) Continuation of application No. 16/296,943, filed on Mar. 8, 2019, now Pat. No. 11,253,820.

(Continued)

(51) Int. Cl.
*B01D 69/12* (2006.01)
*B01D 69/04* (2006.01)
(Continued)

(52) U.S. Cl.
CPC ............ *B01D 69/12* (2013.01); *B01D 69/04* (2013.01); *B01D 69/08* (2013.01); *B01D 69/108* (2022.08);
(Continued)

(58) Field of Classification Search
None
See application file for complete search history.

(56) References Cited

U.S. PATENT DOCUMENTS 3,702,886 A   11/1972  Argauer et al.
4,348,295 A    9/1982  Burba, III
(Continued)

FOREIGN PATENT DOCUMENTS

| RU | 2657495 C1 | 6/2018 |
|---|---|---|
| WO | 2015/171109 A1 | 11/2015 |
| WO | 2016/073007 A1 | 5/2016 |

OTHER PUBLICATIONS

Song et al, Hydrophilic nanoporous ion-exchange membranes as a stabilizing barrier for liquid-liquid membrane extraction of lithium ions, Journal of Membrane Science 471 (2014)372-380 (Year: 2014).*

(Continued)

*Primary Examiner* — Krishnan S Menon
(74) *Attorney, Agent, or Firm* — Scully, Scott, Murphy & Presser, P.C.

(57) ABSTRACT

A lithium extraction composite comprising: (i) a porous support and (ii) particles of a lithium-selective sorbent material coated on at least one surface of the support, wherein the support has a planar membrane, fiber (or rod), or tubular shape. A method for extracting and recovering a lithium salt from an aqueous solution by use of the above-described composition is also described, the method comprising (a) flowing the aqueous source solution through a first zone or over a first surface of the lithium extraction composite to result in selective lithium intercalation in the lithium-selective sorbent material in the first zone or first surface; and (b) simultaneously recovering lithium salt extracted in step (a) from said lithium-selective sorbent material by flowing an aqueous stripping solution through a (Continued)

Tubular Membrane Operating in a Cross-Flow Configuration second zone or over a second surface of the lithium extraction composite in which lithium ions from the first zone or first surface diffuse.

13 Claims, 17 Drawing Sheets

Related U.S. Application Data

(60) Provisional application No. 62/640,405, filed on Mar. 8, 2018.

(51) Int. Cl.
    *B01D 69/08*     (2006.01)
    *B01D 69/10*     (2006.01)
    *B01D 71/02*     (2006.01)
    *B01D 71/34*     (2006.01)
    *B01D 71/44*     (2006.01)
    *C22B 3/24*     (2006.01)
    *C22B 26/12*     (2006.01)

(52) U.S. Cl.
    CPC ......... *B01D 69/125* (2013.01); *B01D 71/021* (2013.01); *B01D 71/024* (2013.01); *B01D 71/34* (2013.01); *B01D 71/441* (2022.08); *C22B 3/24* (2013.01); *C22B 26/12* (2013.01); *B01D 2257/204* (2013.01)

(56) References Cited

U.S. PATENT DOCUMENTS

| | | | |
|---|---|---|---|
| 4,427,789 A | 1/1984 | Miale et al. | |
| 4,461,714 A | 7/1984 | Burba, III | |
| 4,596,704 A | 6/1986 | Miale et al. | |
| 4,721,609 A | 1/1988 | Baacke et al. | |
| 5,529,686 A | 6/1996 | Hagen et al. | |
| 6,280,693 B1 | 8/2001 | Bauman et al. | |
| 6,780,806 B1 | 8/2004 | Yang et al. | |
| 7,459,413 B2 | 12/2008 | Shen et al. | |
| 8,221,718 B2 | 7/2012 | Ackley et al. | |
| 8,637,428 B1 * | 1/2014 | Harrison | B01J 20/28078 502/526 |
| 8,753,594 B1 | 6/2014 | Burba, III et al. | |
| 8,901,032 B1 | 12/2014 | Harrison et al. | |
| 9,012,357 B2 | 4/2015 | Harrison et al. | |
| 10,266,915 B2 | 4/2019 | Paranthaman et al. | |
| 2014/0102946 A1 | 4/2014 | Harrison et al. | |
| 2014/0170041 A1 | 6/2014 | Harrison et al. | |
| 2014/0239221 A1 | 8/2014 | Harrison et al. | |
| 2014/0239224 A1 | 8/2014 | Burba et al. | |
| 2015/0258501 A1 | 9/2015 | Chung et al. | |
| 2016/0230250 A1 | 8/2016 | Chung et al. | |
| 2017/0298475 A1 | 10/2017 | Paranthaman et al. | |
| 2018/0056283 A1 | 3/2018 | Harrison et al. | |

OTHER PUBLICATIONS

"Alumina Trihydrate Ab HD30", Global Product Data Sheet, (2010), Almatis, 2 pages.

"C30 Bayer Hydrate—Hydrated Alumina, Product Information", Alcoa World Alumina, LLC, Apr. 2014, 1 page.

Binnemans, K. et al., "Recycling of rare earths: a critical review", Journal of Cleaner Production, (2013), 51, pp. 1-22 http://dx.doi.org/10.1016/j.jclepro.2012.12.037.

International Search Report and Written Opinion dated Jul. 5, 2019 received in International Application No. PCT/US19/21355, 10 pages.

Li, L. et al., "Lithium Recovery from Aqueous Resources and Batteries: A Brief Review", Johnson Matthey Technology Review, (2018), 62, 2, pp. 161-176, https://doi.org/10.1595/205651317X696676.

Paranthaman, M.P. et al., "Recovery of Lithium from Geothermal Brine with Lithium-Aluminum Layered Double. Hydroxide Chloride Sorbents", Environmental Science & Technology, (2017), 51, pp. 13481-13486, DOI: 10.1021/acs.est.7b03464.

* cited by examiner

LITHIUM EXTRACTION COMPOSITE FOR RECOVERY OF LITHIUM FROM BRINES, AND PROCESS OF USING SAID COMPOSITION

CROSS-REFERENCE TO RELATED APPLICATIONS

The present application is a continuation of U.S. application Ser. No. 16/296,943 filed Mar. 8, 2019, which claims benefit of U.S. Provisional Application No. 62/640,405 filed Mar. 8, 2018, all of the contents of which are incorporated herein by reference.

STATEMENT REGARDING FEDERALLY SPONSORED RESEARCH

This invention was made with government support under Prime Contract No. DE-AC05-00OR22725 awarded by the U.S. Department of Energy. The government has certain rights in the invention.

FIELD OF THE INVENTION

The present invention relates, generally, to compositions for extracting lithium from aqueous solutions, and more particularly, to such compositions in which a lithium salt is incorporated within a metal oxide or metal hydroxide framework. The present invention further relates to the use of lithium sorbent materials incorporated into lithium extraction devices.

BACKGROUND OF THE INVENTION

Lithium is of growing importance as an element for use in a variety of applications, particularly lithium-ion batteries. Economically viable concentrations of lithium are typically found in brines, minerals, and clays in various parts of the world. At one time, lithium production was dominated by producers utilizing spodumene and pegmatite mineral deposits found in the United States. However, South America, Australia, and China currently account for the majority of lithium production.

While hard minerals, such as pegmatite, still account for a significant fraction of lithium production, the majority is recovered from hard rock sources and continental brines. Lithium recovery is typically accomplished using natural evaporative processes. In some instances, the primary product of such brine processing is potassium, with lithium being produced as a side product.

Geothermal brines are of particular interest for a variety of reasons. First, some geothermal brines provide a source of electrical power due to the fact that hot geothermal pools are stored at high pressure underground, which, when released to atmospheric pressure, can provide a flash-steam. The flash-steam can be used, for example, to generate electrical power. In some geothermal waters and brines, associated binary processes can be used to heat a secondary fluid, which can provide steam for the generation of electricity without the flashing of the geothermal brine. Additionally, geothermal brines contain a variety of useful elements, which can be recovered and utilized for secondary processes.

It is known that geothermal brines can include various metal ions, particularly alkali and alkaline earth metals, as well as transition metals, such as lead, silver and zinc, in varying concentrations, depending upon the source of the brine. Recovery of these metals is potentially important to the chemical and pharmaceutical industries. Typically, the economic recovery of metals from natural brines, which may vary widely in composition, depends not only on the specific concentration of the desired metal, but also upon the concentrations of interfering ions, particularly silica, calcium and magnesium, as the presence of such interfering ions will increase recovery costs as additional steps must be taken for their removal.

As lithium has gained importance as an element for use in various applications, there are continuing efforts to develop simple and inexpensive methods for the recovery of lithium. In particular, there have been significant efforts in the use of layered lithium aluminates, typically of the formula $LiX/Al(OH)_3$, such as described in, for example, U.S. Pat. Nos. 9,012,357, 8,901,032, 8,753,594, 8,637,428, 6,280,693, 4,348,295, and 4,461,714 and U.S. Application Publication Nos. 2014/0239224 and 2018/0056283. Unfortunately, such methods, which generally employ packed columns for the recovery, suffer from a number of drawbacks, such as shortened lifetimes due to the gradual deterioration and disintegration of the particles and collapse of the crystal structures. Lithium-manganese oxide compositions have also been used, but they tend to suffer from instability from the use of concentrated acid to recover lithium from the sorbent. The use of packed columns, normally even with the best designs of liquid distribution, cannot prevent mixing of loading and regeneration streams, which results in contamination of even the most selective of sorbent materials. There is a particular need for new materials with exceptional or enhanced lithium uptake and selectivity along with significant mechanical strength and high surface area. There is a further need for such materials that permit easier integration of the extraction and discharging (stripping) steps of lithium processing.

SUMMARY OF THE INVENTION

In one aspect, the present disclosure is directed to a lithium extraction composite useful in extracting lithium salt from an aqueous source solution containing lithium salt. The aqueous source solution is typically a lithium-containing brine, such as a geothermal brine. The composites described herein advantageously exhibit an exceptional or enhanced lithium absorption capacity and/or lithium selectivity along with substantial mechanical strength and a high surface area. By virtue of the substantial mechanical strength, the lithium extraction composite described herein advantageously possesses an exceptional physical resiliency during operation (e.g., resistance to collapse). The lithium extraction composite described herein furthermore also advantageously permits easier integration of the extraction and discharging (stripping) steps of lithium processing, thus significantly simplifying the process and lowering operational costs.

More specifically, the lithium extraction composite contains (i) a support and (ii) particles of a lithium-selective sorbent (i.e., "lithium sorbent") material coated on at least one surface of the support. In some cases, the lithium sorbent is also partially or completely embedded in the support. In some embodiments, the support is a polymer that has a melting point of at least 80° C., 90° C., or 100° C. The polymer may be, for example, a fluoropolymer, polyimide, polyether ether ketone (PEEK), polybenzimidazole, ionomer, polysiloxane, vinyl-addition polymer (e.g., polyvinylchloride, polyethylene, or polypropylene) or copolymer, mixture, or composite thereof. In other embodiments, the support has an inorganic composition, such as a metal oxide, metal carbide, metal nitride, metal boride, or elemental carbon composition. The lithium-selective sorbent material may be, for example, a spinel-type lithium manganese oxide (LMO), spinel-type lithium titanium oxide (LTO), or a lithium alumina intercalate, e.g., lithium aluminum layered double hydroxide chloride (LiCl·2Al(OH)$_3$) or a mixed metal species thereof, such as LiX:M1$_{x-y}$M2$_y$(OH)$_3$, wherein X is at least one anionic species selected from halide, nitrate, sulfate, carbonate, and bicarbonate; M1 is at least one oxophilic main group metal atom selected from aluminum, gallium, and indium; and M2 is at least one oxophilic transition metal atom, and/or at least one oxophilic main group metal atom selected from aluminum, gallium, indium, silicon, germanium, and tin, provided that M1 and M2 are different; x is at least 1 and up to 1.5; y is at least 0.1x and less than x; and the species Li, X, M1, and M2 in Formula (1) are within a framework structure.

In another aspect, the present disclosure is directed to a method for extracting and recovering a lithium salt from an aqueous solution. The method includes flowing an aqueous solution containing a lithium salt (i.e., "source solution") through a first zone of the above described lithium extraction composite to result in selective lithium intercalation in (or selective transfer through) the lithium-selective sorbent material in the first zone; and simultaneously recovering lithium salt extracted in the first zone by flowing an aqueous stripping solution through a second zone of the lithium extraction composite in which lithium ions from the first zone diffuse. Typically, the aqueous stripping solution contains the lithium salt in a concentration of no more than 50% of the concentration of lithium salt in the aqueous (source) solution containing the lithium salt. The aqueous washing (stripping) solution is generally substantially bereft of metal ions other than lithium ions. In particular embodiments, the method employs a membrane support composite having a first and second surface, wherein the method includes: establishing a first flow containing the aqueous source solution over the first surface; establishing a second flow containing the aqueous stripping solution over the second surface; and recovering lithium from the stripping solution In some embodiments, the initial lithium concentration of the stripping solution is lower than a lithium concentration of the lithium-containing brine. In certain embodiments, the first flow is co-current with the second flow. In other embodiments, the first flow is countercurrent to the second flow. In some embodiments, the first flow is not applied at significant hydrostatic pressure, or the first flow is applied at a lower hydrostatic pressure than the second flow. In some embodiments, the lithium sorbent membrane is or includes an alumina lithium intercalate.

In some embodiments, a lithium selective membrane contains a first lithium extractant and a permeable membrane, wherein the extractant is coupled to the permeable membrane. In certain embodiments, the first lithium extractant contains lithium sorbent particles. In some embodiments, the lithium sorbent particles contain a lithium alumina intercalate. In some embodiments, the lithium selective membrane further contains a first stabilizing polymer. In some embodiments, the lithium selective membrane further contains a surface and a first layer, wherein the first layer contains the first lithium extractant incorporated in the first stabilizing polymer, and wherein the first layer is coupled to the surface. In some embodiments, the lithium selective membrane further comprises a second layer, wherein the second layer comprises a second lithium extractant incorporated in a second stabilizing polymer, and wherein the second layer is coupled to the first layer. In certain embodiments, the second layer is not identical to the first layer. In some embodiments of the lithium sorbent membrane, the surface is an outer surface of the permeable membrane. In some embodiments of the lithium sorbent membrane, the surface is an inner surface of the permeable membrane. In some embodiments of the lithium sorbent membrane, the first lithium extractant is formed via in situ synthesis within the permeable membrane. In certain embodiments of the lithium sorbent membrane, the permeable membrane is configured as at least one hollow fiber.

In some embodiments, a membrane extraction unit for recovering lithium from brines comprises a first fluid path that is in fluid communication with a brine feed, a second fluid path that is in fluid communication with a stripping fluid, and a lithium sorbent membrane interposed between the first fluid path and the second fluid path so as to permit transport of lithium from the brine feed to the stripping fluid. In certain embodiments, the membrane extraction unit further includes a housing, wherein the housing includes a first inlet and a first outlet that are in fluid communication with the first fluid path, and a second inlet and a second outlet that are in fluid communication with the second fluid path. In some embodiments of the membrane extraction unit, the lithium sorbent membrane is configured as at least one hollow fiber, wherein the at least one hollow fiber comprises an external surface that is in contact with the first fluid path and the lithium sorbent membrane further includes an interior lumen that is in fluid communication with the second fluid path.

In another aspect, the present disclosure is directed to an apparatus for the selective recovery of a lithium salt from an aqueous source solution containing the lithium salt. In particular embodiments, the apparatus includes: a membrane extraction unit containing a first fluid path, a second fluid path, and a lithium extraction membrane interposed between the first fluid path and the second fluid path, wherein the unit permits transport of lithium between the first fluid path and the second fluid path, wherein the lithium extraction membrane is described above; a first pump in fluid communication with the first fluid path and positioned to induce a first flow of the lithium-containing brine along the first fluid path; and a second pump in fluid communication with the second fluid path and positioned to induce a second flow of the stripping solution along the second fluid path.

In yet another aspect, the present disclosure is directed to a system for selective recovery of lithium from a lithium containing brine. In particular embodiments, the system includes a membrane extraction unit containing a first fluid path, a second fluid path, and a lithium sorbent membrane interposed between the first fluid path and the second fluid path, where the unit permits transport of lithium between the first fluid path and the second fluid path; a source of the lithium-containing brine that is in fluid communication with the first fluid path; a first pump in fluid communication with the first fluid path and positioned to induce a first flow of the lithium-containing brine along the first fluid path; a source of a stripping fluid that is in fluid communication with the second fluid path; and a second pump in fluid communication with the second fluid path and positioned to induce a second flow of the stripping solution along the second fluid path. In some embodiments of the system, the first fluid path and the second fluid path are co-current along the lithium sorbent membrane. In other embodiments of the system, the first fluid path and the second fluid path are countercurrent along the lithium sorbent membrane. In some embodiments of the system, the first pump does not apply significant hydrostatic pressure.

BRIEF DESCRIPTION OF THE DRAWINGS

FIG. 9A shows the concentrations of Li, Na, Ca, Mn, and K with time. FIG. 9B shows the ratio of Li to other cations in the strip.

FIG. 10A shows the concentration of Li, Na, Ca, Mn, and K with time. FIG. 10B shows the ratio of Li to other cations in the strip.

FIG. 13A shows the concentration of Li, Na, Ca, Mn and K with time. FIG. 13B shows the ratio of Li to the other cations in the strip.

FIG. 14A shows the concentration of Li, Na, Ca, and K with time. FIG. 14B shows the ratio of Li to other cations in the strip.

FIG. 16A shows the feed composition, and FIG. 16B shows the strip composition. (Feed: 750 mL simulated brine, Strip: 1125 mL~82 ppm Li in water).

DETAILED DESCRIPTION OF THE INVENTION

Figure 1:
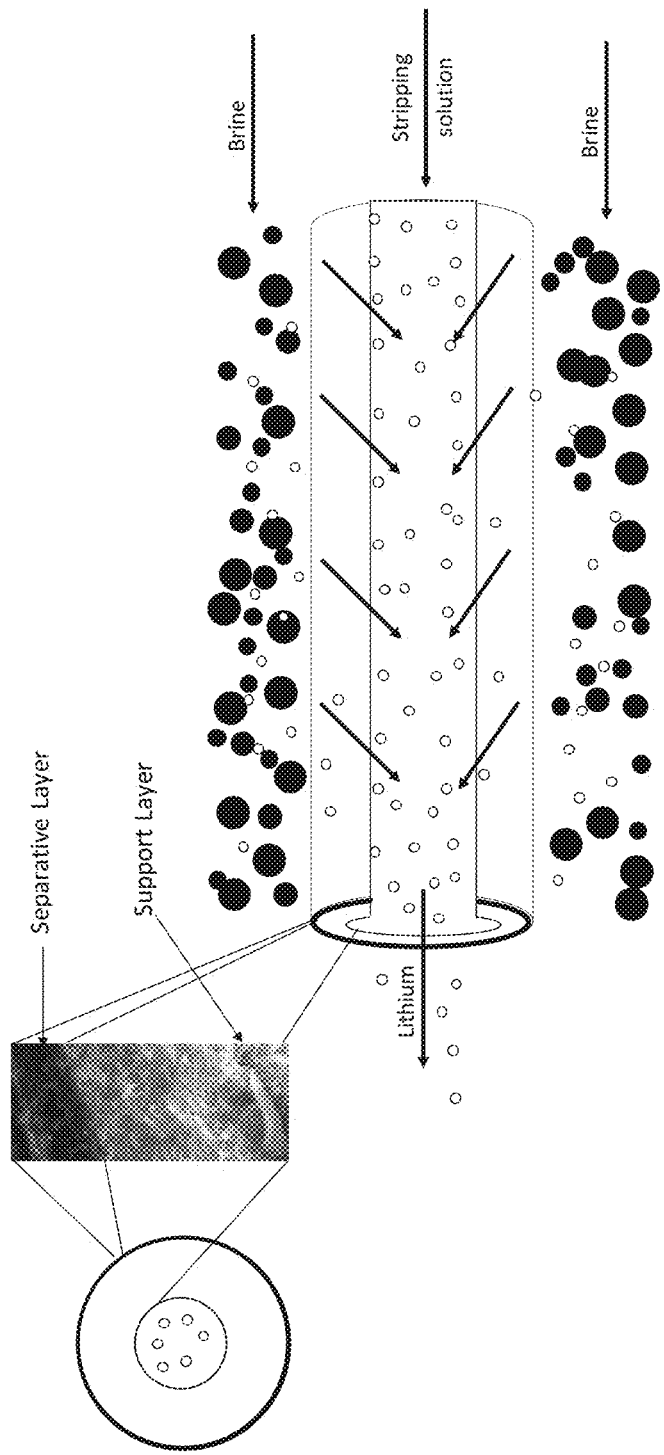
FIG. 1 is a drawing of an exemplary lithium sorbent membrane in tubular configuration.

In a first aspect, the invention is directed to a lithium extraction composite that includes (i) a solid porous support having at least one (e.g., an inner and/or outer surface), and (ii) particles of a lithium-selective sorbent material (i.e., "lithium sorbent material") coated on the at least one surface. In some embodiments, the particles of lithium sorbent material are also partially or entirely embedded below the surface of the support or within the support. The support is porous to permit flow of liquid, and more particularly, to permit permeation of lithium (as selectively extracted from the brine) into the stripping solution. The support needs to be porous to allow the ions and solution to access the sorbent material. However, the sorbent material is substantially or completely impermeable to solution transfer, so that the predominant or only way the lithium is transported from one side of the membrane to the other is by transport through the sorbent material. This prevents mixing of the brine with the extracting material (stripping solution). For example, in some embodiments, the lithium extraction membrane composite comprises: (i) a porous support and (ii) particles of a lithium-selective sorbent material coated along with an impermeable material on inner and/or outer surfaces of the support, wherein the support has a planar, fiber (e.g., rod or cylindrical), or tubular shape. In some embodiments, the lithium extraction composite is a two-layer system in which a porous support is coated with a layer of lithium sorbent, and the lithium sorbent embedded in an impermeable material that is not porous but allows only lithium ions to pass through. Three-layer, four-layer, and higher multi-layer systems may be used. For example, in some embodiments, a porous hollow fiber material (such as PVDF) is coated with one or more layers of a lithium sorbent mixed with the support material (e.g., PVDF) and a crosslinker. In the foregoing example, the PVDF and crosslinker function as an impermeable material while the lithium sorbent permits lithium ions (or lithium salt) to pass through the membrane while blocking other ionic species.

The support may have a polymeric or inorganic composition. In some embodiments, the support is acid resistant. The support is typically thermally stable at a temperature of at least or above 50° C., 60° C., 70° C., 80° C., 90° C., 100° C., 110° C., 120° C., 130° C., 140° C., or 150° C. The term "outer surface" refers to the outermost surface of the support that defines the shape of the support. The term "inner surface" refers to surfaces of the support that are within the bounds of the outer surface, such as typically found in porous and high surface area materials. For purposes of the invention, the support is of macroscopic size (generally, at least 1 cm in at least one dimension) and has a planar porous membrane (i.e., "membrane"), porous fiber (porous rod), or porous tubular shape. The tubular shape may be, for example, a hollow fiber or tube, with hollow fibers generally having an outer diameter of less than 1 mm (1000 microns) and tubes generally having an outer diameter of greater than 1 mm. In some embodiments, the "inner surface" refers to the inner contours of a hollow shape, such as a hollow fiber or tube. The lithium sorbent may be coated onto an outer surface, inner surface, or both. In the case of a planar (membrane) support geometry, the support possesses opposing (e.g., top and bottom) surfaces, in which case one or both of the surfaces may be coated with the sorbent material. One, two, three, four, or more additional layers of the support and/or the sorbent material may also be included.

In particular embodiments, the support is in the shape of a macroscopic planar membrane (i.e., "membrane") typically having a length of at least 1 cm for each side of the membrane and a thickness of at least 1, 5, or 10 mm. In some embodiments, the membrane is a single layer membrane, which is seamless across its thickness dimension. In other embodiments, the membrane is multi-layer (e.g., two-layer, three-layer, or higher-layer) membrane, which is characterized by the presence of discrete transitions (either by differences in composition or physical structure between layers) from one layer to the next across the thickness dimension of the membrane. In some embodiments, one or more gaps or channels are present between one or more layers in a membrane. The one or more gaps or channels are generally present to permit flow of the lithium source solution and/or the lithium stripping solution. Thus, the gaps or channels may represent different zones for liquid flow in the composite membrane. In another particular set of embodiments, the support is in the shape of one or a multiplicity of macroscopic porous tubes or rods, wherein the lithium sorbent material is coated on or embedded in the surface and/or the interior of the tubes or rods. The macroscopic tubes or rods generally have a length of at least 1 cm and a thickness (diameter) of at least 1, 5, or 10 mm.

In one set of embodiments, the support is a polymer. The polymer may be, for example, a polyimide, polyether ether ketone (PEEK), polybenzimidazole, ionomer (e.g., sulfonated tetrafluoroethylene, such as Nafion®), polysiloxane (e.g., a silicone rubber or foam), polyurethane, polycarbonate, polyethyleneimine (PEI), polyester (e.g., polyethylene terephthalate), polyamide (e.g., a nylon), or vinyl-addition polymer (e.g., polyvinylchloride, polyethylene, polypropylene, or a fluoropolymer, such as PVDF or PTFE). The polymer may alternatively be a copolymer that includes one or more of any of the foregoing polymers. The polymer may alternatively be a mixture of polymers that includes at least one of the foregoing polymers. The polymer may alternatively be a composite that includes at least one of the foregoing polymers, wherein the composite includes separate regions (e.g., layers) of polymers of different compositions.

In another set of embodiments, the support has an inorganic composition. The term "inorganic," as used herein, refers to those compositions not containing carbon or wherein carbon is present but in its elemental state. Typically, the inorganic composition includes at least one metal, wherein the term "metal," as used herein, includes traditionally defined metals as well as metalloids (those elements having both metallic and non-metallic properties and which overlap with the main group elements). In a first exemplary embodiment, the inorganic composition is or includes a metal oxide composition, such as silica, gibbsite, bayerite, alumina (e.g., □-, □-, or □-alumina, $\theta$-$Al_2O_3$, $\chi$-$Al_2O_3$, $\kappa$-$Al_2O_3$, $\epsilon$-$Al_2O_3$, $\delta$-$Al_2O_3$, AlO(OH), pseudoboehmite, or a combination thereof), or an aluminosilicate, such as a zeolite, e.g., MFI-type, MEL-type, MTW-type, MCM-type, BEA-type, faujasite, or ZSM-type zeolites. The metal oxide composition may alternatively be or include, for example, zirconium oxide, yttrium oxide, titanium oxide, cerium oxide, chromium oxide, copper oxide, nickel oxide, or hafnium oxide, or a combination thereof. In a second exemplary embodiment, the inorganic composition is or includes a metal carbide composition, such as silicon carbide, iron carbide (e.g., steel), tungsten carbide, titanium carbide, molybdenum carbide, or boron carbide, or combination thereof. In a third exemplary embodiment, the inorganic composition is or includes a metal nitride composition, such as boron nitride, silicon nitride, silicon oxynitride, silicon carbide nitride, aluminum nitride, tantalum nitride, or zirconium nitride, or combination thereof. In a fourth exemplary embodiment, the inorganic composition is or includes a metal boride composition, such as aluminum boride, titanium boride, cobalt boride, tantalum boride, or magnesium boride, or combination thereof. In some embodiments, the inorganic composition is a ceramic composition, which may be an oxide, carbide, nitride, or boride material, such as any of the compositions exemplified above. In a fifth exemplary embodiment, the inorganic composition is or includes an element in its zerovalent (elemental) state, such as a transition metal (e.g., iron, cobalt, nickel, or zinc) or a main group element (e.g., carbon). In the case of the support being carbon, the carbon support may be a molecular sieve carbon material or oxide-modified version thereof, as well known in the art (e.g., H. C. Foley, *ACS Symposium Series*, vol. 368, Chapter 21, pp. 335-360, 1988, the contents of which are herein incorporated by reference in their entirety). Mixtures or composites of any of the above inorganic compositions may also be used. In some embodiments, any one or more classes or specific types of inorganic compositions described above may be excluded.

The lithium sorbent can have any of the compositions known in the art. The lithium sorbent can be, for example, a spinel-type lithium manganese oxide (LMO), spinel-type lithium titanium oxide (LTO), or lithium intercalate material, such as lithium aluminum layered double hydroxide chloride ($LiCl·2Al(OH)_3$). LMO, LTO, and lithium aluminum layered double hydroxide chloride materials are described in detail in, for example, L. Li et al., *Johnson Matthey Technol. Rev.*, 62(2), 161-176, 2018 and V. P. Isupov, *Journal of Structural Chemistry*, 40(5), 672-685, 1999, the contents of which are herein incorporated by reference in their entirety.

The lithium sorbent material is generally present in the lithium extraction composite material as particles. Generally, the sorbent particles have a size of about 1, 2, 5, 10, 20, 30, 40, or 50 nm, or a size within a range bounded by any two of the foregoing values. The term "about," as used herein, generally indicates a deviation of no more than 10%, 5%, or 1% from a given value.

In some embodiments, the lithium sorbent composition includes lithium (i.e., as lithium ions), metal atoms (i.e., other than lithium, typically in a cationic state), oxygen atoms, and an (i.e., at least one) anionic species (X) selected from halide (e.g., fluoride, chloride, bromide, or iodide), nitrate ($NO_3^-$), sulfate ($SO_4^{2-}$), carbonate ($CO_3^{2-}$), and bicarbonate ($HCO_3^-$), all in a framework structure. The oxygen atoms may, in some embodiments, be in the form of oxide ions ($O^{2-}$), as in a zeolitic structure. In other embodiments, the oxygen atoms are present as hydroxide (OH) groups, or as both oxide and hydroxide groups, as in aluminum hydroxide, aluminum oxyhydroxide, and aluminosilicate structures (e.g., kaolinite). The term "framework structure," as used herein and as well recognized in the art, refers to a network structure (e.g., one-, two-, or three-dimensional) in which components in the structure are interconnected by, for example, covalent and/or ionic bonds, in analogous fashion to zeolites and metal-organic frameworks (MOFs), both of which are well known in the art. The oxygen atoms, whether as oxide or hydroxide groups, are typically bound to at least the metal atoms in such structures.

In the above-described framework composition (for the lithium sorbent), the metal atoms are selected from at least one (i.e., one, two, or more) of oxophilic main group metal atoms and/or oxophilic transition metal atoms. The term "metal atom," as used herein, indicates the presence of metal atoms in a cationic state, as distinguished from a bulk metal in the zerovalent state.

In one embodiment, the above-described framework composition (for the lithium sorbent) contains at least one (i.e., one, two, or more) oxophilic main group metal atom. The oxophilic main group metals generally include the elements in Groups 13-16 of the Periodic Table. Some examples of oxophilic main group metals include boron, aluminum, gallium, indium, silicon, germanium, tin, lead, arsenic, antimony, bismuth, selenium, and tellurium. The framework composition may or may not also include one or more oxophilic transition metal atoms.

In another embodiment, the above-described framework composition (for the lithium sorbent) contains at least one oxophilic transition metal atom. The oxophilic transition metals generally include the elements in Groups 3-12 of the Periodic Table. Some examples of oxophilic transition metals include scandium, titanium, vanadium, chromium, manganese, iron, cobalt, nickel, copper, zinc, yttrium, zirconium, and niobium. The framework composition may or may not also include one or more oxophilic main group metal atoms.

In other embodiments, the above-described framework composition (for the lithium sorbent) contains at least one oxophilic main group metal and at least one oxophilic transition metal. For example, in some embodiments, the framework composition includes at least one of boron, aluminum, gallium, or indium, along with at least one of titanium, vanadium, chromium, manganese, iron, cobalt, nickel, copper, or zinc. In other embodiments, the framework composition includes at least one of aluminum or gallium as a main group metal and at least one of any one, two, or more of the exemplary transition metals provided above.

In some embodiments, the above-described framework composition (for the lithium sorbent) excludes one or more classes or specific types of metal atoms provided above. In particular embodiments, the composition may exclude aluminum, or may exclude Group 13 and/or Group 14 metals, or may exclude all main group metals.

In some embodiments, if the metal atoms within a framework structure of the lithium sorbent include aluminum atoms, then the composition includes at least one metal other than aluminum and selected from oxophilic main group and/or oxophilic transition metal atoms provided above, other than aluminum. The at least one metal other than aluminum may be within the same framework structure, in which case the composition is single-phase, or the at least one metal other than aluminum may be within at least one other framework structure within the same composition, in which case the composition is two-phase or a higher phase, depending on the number of discrete framework structures. In the event that the at least one metal other than aluminum is within the same framework structure, generally at least 10 mol % of the aluminum atoms are substituted with at least one metal atom selected from any one or more of the oxophilic main group and/or oxophilic transition metal atoms provided above, other than aluminum. In particular embodiments, at least 10 mol % of the aluminum atoms are substituted with at least one oxophilic transition metal (e.g., one or two of chromium, manganese, iron, cobalt, nickel, copper, or zinc) and/or at least one oxophilic main group metal that is not aluminum (e.g., one or two of boron, gallium, or indium). In some embodiments, about, at least, above, up to, or less than, for example, 15, 20, 25, 30, 35, 40, 45, 50, 60, 70, 80, 90, or 95 mol % of the aluminum atoms are substituted with one or more metal atoms other than aluminum, as provided above. In other embodiments, if the metal atoms include boron, gallium, or indium, then at least 10 mol % of the boron, gallium, or indium atoms are substituted with at least one metal atom selected from any one or more of the oxophilic main group and/or oxophilic transition metal atoms provided above, other than boron, gallium, or indium.

In the framework structure (of the lithium sorbent), the lithium is present in an amount less than a saturated amount in order to permit extraction of lithium salt from the aqueous solution. For example, if the saturation amount is represented by the value w, then lithium is present in an amount less than w, such as 10%, 20%, 30%, 40%, 50%, 60%, 70%, 80%, or 90% of w.

In a first particular set of embodiments, the lithium sorbent includes a framework structure containing LiX and $M(OH)_z$ units, wherein X is at least one anionic species selected from halide, nitrate, sulfate, carbonate, and bicarbonate; M is at least one (e.g., one, two, or three) oxophilic metal atoms, such as at least one oxophilic transition metal atom, and/or at least one oxophilic main group metal atom selected from aluminum, gallium, indium, silicon, germanium, and tin; and z is independently 2, 3, or 4, depending on the metal atom M. In the framework composition, if M is exclusively aluminum, then the solid framework composition further includes $M'(OH)_z$ units, either in the same framework structure containing LiX and $M(OH)_z$ units (i.e., as single-phase) or in a separate framework structure comprising LiX and $M'(OH)_z$ units (i.e., as two-phase), wherein M' is a metal that is not aluminum. M' can be, for example, at least one oxophilic transition metal atom and/or at least one oxophilic main group metal atom selected from gallium, indium, silicon, germanium, and tin.

In the event that M represents a single metal and does not include aluminum in the framework structure (of the lithium sorbent), then the framework composition may contain only LiX and $M(OH)_z$ units, in which case the composition is single-phase. In particular embodiments, the single-phase composition contains LiX and $M(OH)_z$ units wherein M is a transition metal, such as a metal selected from V, Cr, Mn, Fe, Co, Ni, Cu, or Zn, in the absence of M being Al, or in the absence of M being any one or more of gallium, indium, silicon, germanium, and tin. For example, the single-phase composition may be composed of LiX (e.g., LiCl) and $Fe(OH)_3$ units, in the absence of M being Al, or in the absence of M being any one or more of gallium, indium, silicon, germanium, and tin. In the event that M represents at least two metals and does not include aluminum, then the framework composition may be a single-phase framework structure containing LiX and equivalent $M(OH)_z$ units (with each M being at least two metals that are not aluminum) or the framework composition may be two-phase by containing different framework structures with different $M(OH)_z$ units having two different M metals that are not aluminum. In the event that M represents aluminum and at least one other metal, then the framework composition may be a single-phase framework structure containing the LiX and equivalent $M(OH)_z$ units (wherein M contains Al and at least one other metal, which may be, for example, one or more transition metals and/or main group metals, as provided above) or the framework composition may be two-phase by containing different framework structures with different $M(OH)_z$ units. In the case of a two-phase composition, the two-phase composition may be a mixture of LiX and at least two different types of $M(OH)_z$ units, which may or may not include Al, and which may exclude one or more of any of the transition metals and/or main group metals provided above. For example, the two-phase composition may include LiX units within a mixture of $Al(OH)_3$ units and $M(OH)_z$ units, or more particularly, within a mixture of $Al(OH)_3$ units and $M(OH)_3$ units, with M being one or more transition metals, such as Fe or Fe in combination with another transition metal or a main group metal (e.g., $Al(OH)_3$ units in admixture with $Fe(OH)_3$ or $Fe_{x-y}M_y(OH)_z$ units). Moreover, in the foregoing example, the Al(OH)$_3$ units may or may not be replaced with or be in further combination with M(OH)$_z$ units taking M as one or more metals selected from gallium, indium, silicon, germanium, and tin. Alternatively, the Al in any of the foregoing embodiments may be partially substituted with one or more transition metals and/or main group metals, which may result in, for example, Al$_{x-y}$Ga$_y$(OH)$_3$ or Al$_{x-y}$Fe$_y$(OH)$_3$ units. In some embodiments, three or more distinct types of M(OH)$_z$ units form a three-phase or higher-phase framework composition.

In a second particular set of embodiments, the framework structure (of the lithium sorbent) has a composition according to the following chemical formula:

$$\text{LiX:M1}_{x-y}\text{M2}_y(\text{OH})_3 \cdot n\text{H}_2\text{O} \qquad (1)$$

In the above Formula (1), X is an anionic species as provided above, i.e., selected from halide, nitrate, sulfate, carbonate and bicarbonate. One, two, or more of the foregoing anionic species may be included within the variable X. In some embodiments, X is a halide, particularly chloride. The variable M1 represents at least one oxophilic main group metal atom selected from aluminum, gallium, and indium; and M2 is at least one oxophilic transition metal atom (e.g., V, Cr, Mn, Fe, Co, Ni, Cu, or Zn), as provided above, and/or at least one oxophilic main group metal atom, as provided above, particularly those selected from aluminum, gallium, indium, silicon, germanium, and tin, provided that M1 and M2 are different. The variable x is at least 1, 1.1, or 1.2 and up to 1.3, 1.4, or 1.5, or the variable x may be precisely any of the foregoing values or within a range bounded by any two of the foregoing values. The variable y is at least 0.1x and up to or less than x. The variable y can be, for example, precisely or at least 0.1x, 0.2x, 0.3x, 0.4x, 0.5x, 0.6x, 0.7x, 0.8x, or 0.9x, and up to or less than x, or y can be within a range bounded by any two of the foregoing values. The variable n is a number of up to or less than 4 (i.e., n is <4), such as an integer of 0, 1, 2, 3, or 4. Moreover, although three hydroxy groups are shown in Formula (1), it should be appreciated that the molar amount of hydroxy groups may be in a fractional amount above or below 3, depending on the nature and relative amount of the M2 species. Thus, the above Formula (1) and sub-formulas are intended to also encompass compositions of the following types, for example: LiX:M1$_{x-y}$M2$_y$(OH)$_{2.5}$, LiX:M1$_{x-y}$M2$_y$(OH)$_{2.8}$, LiX:M1$_{x-y}$M2$_y$(OH)$_{2.9}$, LiX:M1$_{x-y}$M2$_y$(OH)$_{3.1}$, LiX:M1$_{x-y}$M2$_y$(OH)$_{3.2}$, and LiX:M1$_{x-y}$M2$_y$(OH)$_{3.5}$.

In particular embodiments of Formula (1), M1 is or includes aluminum, which corresponds to the following sub-formula (and hydrates thereof):

$$\text{LiX:Al}_{x-y}\text{M2}_y(\text{OH})_3 \qquad (1\text{-}1)$$

In one set of embodiments in Formula (1-1), M2 is at least one oxophilic transition metal atom, as provided above. Some examples of compositions wherein M2 is iron (Fe) and x is 1 include LiX:Al$_{0.9}$Fe$_{0.1}$(OH)$_3$, LiX:Al$_{0.8}$Fe$_{0.2}$(OH)$_3$, LiX:Al$_{0.7}$Fe$_{0.3}$(OH)$_3$, LiX:Al$_{0.6}$Fe$_{0.4}$(OH)$_3$, LiX:Al$_{0.5}$Fe$_{0.5}$(OH)$_3$, LiX:Al$_{0.4}$Fe$_{0.6}$(OH)$_3$, LiX:Al$_{0.3}$Fe$_{0.7}$(OH)$_3$, LiX:Al$_{0.2}$Fe$_{0.8}$(OH)$_3$, LiX:Al$_{0.1}$Fe$_{0.9}$(OH)$_3$, and LiX:Fe(OH)$_3$. Some examples of compositions wherein M2 is Fe and x is 1.2 include LiX:Al$_{1.1}$Fe$_{0.1}$(OH)$_3$, LiX:AlFe$_{0.2}$(OH)$_3$, LiX:Al$_{0.9}$Fe$_{0.3}$(OH)$_3$, LiX:Al$_{0.8}$Fe$_{0.4}$(OH)$_3$, LiX:Al$_{0.7}$Fe$_{0.5}$(OH)$_3$, LiX:Al$_{0.6}$Fe$_{0.6}$(OH)$_3$, LiX:Al$_{0.5}$Fe$_{0.7}$(OH)$_3$, LiX:Al$_{0.4}$Fe$_{0.8}$(OH)$_3$, LiX:Al$_{0.3}$Fe$_{0.9}$(OH)$_3$, LiX:Al$_{0.2}$Fe(OH)$_3$, and LiX:Al$_{0.1}$Fe$_{1.1}$(OH)$_3$. Some examples of compositions wherein M2 is Fe and x is 1.5 include LiX:Al$_{1.4}$Fe$_{0.1}$(OH)$_3$, LiX:Al$_{1.3}$Fe$_{0.2}$(OH)$_3$, LiX:Al$_{1.2}$Fe$_{0.3}$(OH)$_3$, LiX:Al$_{1.1}$Fe$_{0.4}$(OH)$_3$, LiX:AlFe$_{0.5}$(OH)$_3$, LiX:Al$_{0.9}$Fe$_{0.6}$(OH)$_3$, LiX:Al$_{0.8}$Fe$_{0.7}$(OH)$_3$, LiX:Al$_{0.7}$Fe$_{0.8}$(OH)$_3$, LiX:Al$_{0.6}$Fe$_{0.9}$(OH)$_3$, LiX:Al$_{0.5}$Fe(OH)$_3$, LiX:Al$_{0.4}$Fe$_{1.1}$(OH)$_3$, LiX:Al$_{0.3}$Fe$_{1.2}$(OH)$_3$, LiX:Al$_{0.2}$Fe$_{1.3}$(OH)$_3$, and LiX:Al$_{0.1}$Fe$_{1.4}$(OH)$_3$. Several other exemplary compositions are possible, including those in which Fe in any of the preceding examples is replaced with V, Cr, Mn, Fe, Co, Ni, Cu, or Zn, or those in which Al in any of the preceding examples is replaced with B, Ga, or In. In some embodiments, M2 represents more than one transition metal, as exemplified by, for example, LiX:Al$_{0.8}$Fe$_{0.1}$Ni$_{0.1}$(OH)$_3$, LiX:Al$_{0.8}$Fe$_{0.1}$Co$_{0.1}$(OH)$_3$, LiX:Al$_{0.8}$Fe$_{0.1}$Zn$_{0.1}$(OH)$_3$, LiX:Al$_{0.8}$Ni$_{0.1}$Co$_{0.1}$(OH)$_3$, LiX:Al$_{0.8}$Ni$_{0.1}$Fe$_{0.1}$(OH)$_3$, LiX:Al$_{1.2}$Fe$_{0.2}$Ni$_{0.1}$(OH)$_3$, LiX:Al$_{1.2}$Fe$_{0.2}$Co$_{0.1}$(OH)$_3$, LiX:Al$_{1.2}$Fe$_{0.2}$Zn$_{0.1}$(OH)$_3$, LiX:Al$_{1.2}$Ni$_{0.2}$Co$_{0.1}$(OH)$_3$, and LiX:Al$_{1.2}$Ni$_{0.2}$Fe$_{0.1}$(OH)$_3$.

In another set of embodiments in Formula (1-1), M2 is at least one oxophilic main group metal atom, as provided above. Some examples of compositions wherein M2 is gallium (Ga) and x is 1 include LiX:Al$_{0.9}$Ga$_{0.1}$(OH)$_3$, LiX:Al$_{0.8}$Ga$_{0.2}$(OH)$_3$, LiX:Al$_{0.7}$Ga$_{0.3}$(OH)$_3$, LiX:Al$_{0.6}$Ga$_{0.4}$(OH)$_3$, LiX:Al$_{0.5}$Ga$_{0.5}$(OH)$_3$, LiX:Al$_{0.4}$Ga$_{0.6}$(OH)$_3$, LiX:Al$_{0.3}$Ga$_{0.7}$(OH)$_3$, LiX:Al$_{0.2}$Ga$_{0.8}$(OH)$_3$, LiX:Al$_{0.1}$Ga$_{0.9}$(OH)$_3$, and LiX:Ga(OH)$_3$. Some examples of compositions wherein M2 is Ga and x is 1.2 include LiX:Al$_{1.1}$Ga$_{0.1}$(OH)$_3$, LiX:AlGa$_{0.2}$(OH)$_3$, LiX:Al$_{0.9}$Ga$_{0.3}$(OH)$_3$, LiX:Al$_{0.8}$Ga$_{0.4}$(OH)$_3$, LiX:Al$_{0.7}$Ga$_{0.5}$(OH)$_3$, LiX:Al$_{0.6}$Ga$_{0.6}$(OH)$_3$, LiX:Al$_{0.5}$Ga$_{0.7}$(OH)$_3$, LiX:Al$_{0.4}$Ga$_{0.8}$(OH)$_3$, LiX:Al$_{0.3}$Ga$_{0.9}$(OH)$_3$, LiX:Al$_{0.2}$Ga(OH)$_3$, and LiX:Al$_{0.1}$Ga$_{1.1}$(OH)$_3$. Some examples of compositions wherein M2 is Ga and x is 1.5 include LiX:Al$_{1.4}$Ga$_{0.1}$(OH)$_3$, LiX:Al$_{1.3}$Ga$_{0.2}$(OH)$_3$, LiX:Al$_{1.2}$Ga$_{0.3}$(OH)$_3$, LiX:Al$_{1.1}$Ga$_{0.4}$(OH)$_3$, LiX:AlGa$_{0.5}$(OH)$_3$, LiX:Al$_{0.9}$Ga$_{0.6}$(OH)$_3$, LiX:Al$_{0.8}$Ga$_{0.7}$(OH)$_3$, LiX:Al$_{0.7}$Ga$_{0.8}$(OH)$_3$, LiX:Al$_{0.6}$Ga$_{0.9}$(OH)$_3$, LiX:Al$_{0.5}$Ga(OH)$_3$, LiX:Al$_{0.4}$Ga$_{1.1}$(OH)$_3$, LiX:Al$_{0.3}$Ga$_{1.2}$(OH)$_3$, LiX:Al$_{0.2}$Ga$_{1.3}$(OH)$_3$, and LiX:Al$_{0.1}$Ga$_{1.4}$(OH)$_3$. Several other exemplary compositions are possible, including those in which Ga in any of the preceding examples is replaced with B, In, Si, Ge, or Sn. In some embodiments, M2 represents more than one main group metal, as exemplified by, for example, LiX:Al$_{0.8}$Ga$_{0.1}$In$_{0.1}$(OH)$_3$, LiX:Al$_{0.8}$Ga$_{0.1}$Si$_{0.1}$(OH)$_3$, or LiX:Al$_{0.8}$Ga$_{0.1}$Sn$_{0.1}$(OH)$_3$. In yet other embodiments, M2 includes at least one oxophilic main group metal and at least one oxophilic transition metal, as exemplified by, for example, LiX:Al$_{1.2}$Fe$_{0.2}$Ga$_{0.1}$(OH)$_3$, LiX:Al$_{1.1}$Fe$_{0.2}$Ga$_{0.1}$In$_{0.1}$(OH)$_3$, LiX:Al$_{1.2}$Fe$_{0.1}$Ni$_{0.1}$Ga$_{0.1}$(OH)$_3$, and LiX:Al$_{1.1}$Fe$_{0.1}$Ni$_{0.1}$Ga$_{0.1}$In$_{0.1}$(OH)$_3$.

In the above Formulas (1) and (1-1), M1 or M2 may or may not also include one or more alkaline earth metals. Some examples of such compositions include LiX:Al$_{1.2}$Fe$_{0.2}$Mg$_{0.1}$(OH)$_3$, LiX:Al$_{0.5}$Fe$_{0.5}$Mg$_{0.5}$(OH)$_3$, LiX:Al$_{0.3}$Fe$_{0.7}$Mg$_{0.5}$(OH)$_3$, LiX:Al$_{1.2}$Fe$_{0.2}$Ca$_{0.1}$(OH)$_3$, LiX:Al$_{1.1}$Fe$_{0.2}$Zn$_{0.1}$Mg$_{0.1}$(OH)$_3$, LiX:Al$_{1.1}$Fe$_{0.2}$Mg$_{0.1}$Ca$_{0.1}$(OH)$_3$, LiX:Al$_{1.2}$Ga$_{0.2}$Mg$_{0.1}$(OH)$_3$, LiX:Al$_{0.8}$In$_{0.5}$Mg$_{0.2}$(OH)$_3$, LiX:Al$_{0.9}$In$_{0.4}$Fe$_{0.1}$Mg$_{0.1}$(OH)$_3$, and LiX:Fe$_{0.9}$Mg$_{0.1}$(OH)$_3$.

The above-described framework structures (of the lithium sorbent) according to Formulas (1) and (1-1) can be produced according to well-known methods, except that the methods may be appropriately modified to produce specific compositions described above. For example, while it is well known in the conventional art to produce LiX/Al(OH)$_3$ compositions by reaction of LiOH and Al(OH)$_3$ in the presence of dilute amounts of HCl (e.g., U.S. Pat. Nos. 8,309,043 and 6,280,693), the method described herein can achieve the compositions described herein by reacting LiOH and Al(OH)$_3$, along with a metal salt containing a metal corresponding to M2 and that is soluble in the aqueous solution (e.g., FeSO$_4$, Fe(CH$_3$COO)$_2$, FeCl$_2$, CoSO$_4$, and NiSO$_4$) in the presence of dilute HCl.

The framework structure (of the lithium sorbent) may alternatively have a zeolitic type of structure, except that, for purposes of the present invention, the zeolitic material includes lithium atoms and at least one metal atom (e.g., M1 and/or M2). As well known in the art, a zeolite typically includes a microporous framework constructed of interconnected metal and oxide atoms. A large number of zeolites have an aluminosilicate composition. Typically, the zeolite is ordered by having a crystalline or partially crystalline structure. The zeolite can generally be described as a three-dimensional framework containing silicate ($SiO_2$ or $SiO_4$) and/or aluminate ($Al_2O_3$ or $AlO_4$) units that are interconnected (i.e., crosslinked) by the sharing of oxygen atoms. The zeolite can be, for example, a MFI-type zeolite, MEL-type zeolite, MTW-type zeolite, MCM-type zeolite, BEA-type zeolite, kaolin, or a faujasite-type of zeolite. Some particular examples of zeolites include the ZSM class of zeolites (e.g., ZSM-5, ZSM-8, ZSM-11, ZSM-12, ZSM-15, ZSM-23, ZSM-35, ZSM-38, ZSM-48), zeolite X, zeolite Y, zeolite beta, and the MCM class of zeolites (e.g., MCM-22 and MCM-49). The compositions, structures, and properties of these zeolites are well-known in the art, and have been described in detail, as found in, for example, U.S. Pat. Nos. 4,721,609, 4,596,704, 3,702,886, 7,459,413, and 4,427,789, the contents of which are incorporated herein by reference in their entirety. The incorporation of lithium atoms and other metals into zeolites can be achieved by utilizing methodology well known in the art, such as any of the zeolite impregnation, ion exchange, or synthetic processes known in the art, as provided in, for example, U.S. Pat. No. 6,780,806, the contents of which are incorporated herein by reference in their entirety. Some additional examples of zeolitic compositions considered herein include sodalite (e.g., $Na_8(Al_6Si_6O_{24})Cl_2$) and $Li_8(AlSiO_4)_6Cl_2$, wherein Al may be partially or completely replaced by one or more metal atoms, such as provided above for M1 and M2, particularly Ga and In; and wherein the Si may be partially or completely replaced by one or more metal atoms, such as provided above for M1 and M2, particularly Ge and Sn.

For purposes of the invention, the framework structure (of the lithium sorbent), whether according to Formulas (1) or (1-1) or a zeolite, should include vacant sites for absorption of lithium ions for the purpose of extracting the lithium salt. The vacant sites may be introduced during synthesis, or alternatively, as a post-processing step, prior to contact with the aqueous source solution. To ensure the presence of vacant sites, the mole fraction of Li to the metal(s), or more particularly Li to Al, should be less than 1, and more typically a mole fraction of up to or less than 0.8, 0.7, 0.6, 0.5, 0.4, 0.3, 0.2, or 0.1, or a mole fraction within a range bounded by any two of the foregoing values. The ratio of lithium to metal (e.g., lithium to aluminum) is critical in stabilizing the structural form of the material and maximizing the number of lithium sites available in the matrix for the loading and unloading of lithium from the aqueous source solution.

In another aspect, the invention is directed to a method of extracting a lithium salt from an aqueous source solution containing the lithium salt, by extracting the lithium salt into the above-described lithium extraction composite and releasing and recovering the lithium salt from the lithium extraction composite. By virtue of the novel process described herein, the extraction is typically practiced without applying a pressure gradient on the lithium extraction composite. The aqueous source solution can be any aqueous solution containing a lithium salt, which may be either in the absence or presence of other metal salt species (e.g., sodium, potassium, magnesium, and/or calcium salt species). The aqueous source solution is typically a natural brine, such as a continental, geothermal, oilfield geothermal, Smackover, or salar brine solution. However, the aqueous source solution may also be anthropogenic, such as a high ionic strength solution emanating from a lithium waste recovery process, such as may occur in a lithium battery recycling process. The lithium can be present in any concentration in the aqueous source solution, typically in an amount of at least 0.1M concentration. In different embodiments, the lithium is present in a concentration of at least or above 0.1, 0.2, 0.5, 1, 2, 3, 4, 5, 6, 7, 8, 9, or 10M concentration, or in a concentration within a range bounded by any two of the foregoing values. Moreover, in some embodiments, the aqueous source solution is processed in its original or unadulterated state, whereas, in other embodiments, the aqueous source solution is concentrated in order to attain a higher concentration of lithium, or other salt species are added or removed prior to the instantly described process to improve aspects of the process.

In the process, the aqueous source solution is first passed (i.e., flowed) through a first zone (fluid path) or over a first surface of the lithium extraction composite, which can have a porous planar membrane, porous fiber, or porous tubular shape, or as an assembly of such composite devices. The first flow, described above, results in selective lithium intercalation in the lithium-selective sorbent material in the first zone. The phrase "over a first surface" or "over a second surface," as used herein, indicates that the solution is "in contact with" the first or second surface, respectively. The flowing step can be conducted by any suitable means, as well known in the art, including flowing the aqueous source solution in a downflow mode or an upflow mode. During passage of the aqueous source solution, lithium from the source solution is largely selectively extracted from the source solution into particles of the lithium sorbent while the remainder of the source solution resides in inter-particle spacings of the lithium sorbent. If non-lithium salt species (e.g., sodium, potassium, magnesium, and/or calcium) are also included in the source solution, the non-lithium salt species will remain substantially or completely unabsorbed and reside in the inter-particle volume (or support spacings) of the lithium sorbent occupied by the source solution.

Simultaneously with the flowing of the aqueous source solution described above, the lithium salt absorbed (i.e., captured) in the lithium sorbent is recovered by flowing an aqueous stripping solution through a second zone or over a second surface of the lithium extraction composite in which lithium ions from the first zone or first surface diffuse into. The flow with stripping solution may be referred to as the second flow. The aqueous stripping solution, before being flowed through the second zone, contains lithium salt (same or different from the lithium salt in the source solution) in a concentration of no more than or less than 50 wt % of the concentration of lithium in the starting aqueous source solution. The use of lithium salt in the stripping solution is to prevent the collapse of the structure of particulate composition. In order to obtain lithium salt with minimal presence of other non-lithium salt species, the stripping solution should be substantially bereft of metal ions (metal salts) other than lithium salts (lithium ions). Thus, the stripping solution, before flowing through the lithium extraction composite, should contain a lithium salt dissolved in water in the substantial absence of other dissolved species. The lower lithium concentration in the stripping solution provides the driving force for desorption of lithium salt from the lithium sorbent. In different embodiments, the stripping solution contains lithium salt, and independently, total salt, in a concentration of up to or less than 50, 40, 30, 20, 10, or 5 wt % of the concentration of total salts in the starting aqueous source solution. The stripping solution, once passed through the lithium sorbent, may be further processed to further isolate or separate the lithium salt contained therein. For example, the spent strip may be concentrated, and the concentrated contents precipitated and/or crystallized and recrystallized.

In some embodiments, the first and/or second flows are conducted at a temperature at about room temperature, i.e., about 25° C. In other embodiments, the first and/or second flows are conducted at a temperature above room temperature, i.e., at or above, for example, 30, 35, 40, 45, 50, 55, 60, 65, 70, 75, 80, 85, 90, 100, 110, 120, 130, 140, or 150° C., such as may be provided by a geothermal brine.

In particular embodiments, the lithium extraction composite is in the shape of a membrane having a first surface and a second surface, which may correspond to first and second zones, respectively, as described above. The membrane configuration is particularly suitable in a lithium extraction method in which the following steps are conducted: (i) establishing a first flow containing the aqueous source solution over the first surface; (ii) establishing a second flow containing the aqueous stripping solution over the second surface; and (iii) recovering lithium from the stripping solution. In some embodiments, the first flow is co-current with the second flow. In other embodiments, the first flow is countercurrent to the second flow. In some embodiments, the first flow is applied at a lower hydrostatic pressure than the second flow.

In some embodiments, a lithium-selective sorbent is utilized in conjunction with a permeable membrane material. Suitable sorbent compositions include an intercalated material that includes lithium and a three-dimensionally structured permeable activated alumina material, which can be used in the removal and recovery of lithium from solutions, particularly lithium salts from geothermal and other brines. Such an activated alumina lithium intercalate sorbent composition advantageously provides a controllable and maximum allowable lithium to aluminum ratio, and a favorable structural form of particulate media, thereby providing increased capacity for removal and recovery of lithium. In certain embodiments, the activated alumina lithium intercalate sorbent composition has a mole fraction of lithium to aluminum in the range of about 0.1 to 0.3, or about 0.1 to 0.33. The ratio of lithium to aluminum plays an important role in stabilizing the structural form of the material and maximizing the number of lithium sites available in the matrix for the loading and unloading of lithium from a brine solution.

As noted above, such alumina lithium intercalates can be integrated with permeable sheets and/or membranes that are compatible with brines. A variety of permeable sheets and/or membranes are suitable for this purpose, such as, for example, permeable sheets and membranes that are utilized for water treatment or filtration. Such permeable membranes or sheets can be made of any suitably mechanically stable and chemically resistant material, including polymers (e.g., fluoropolymers), carbon, metals, glasses, and ceramics. Composite materials, such as alumina, aluminum titanate, silicon carbide, magnesium aluminum oxide, manganese oxide, and silica, can also serve as supports or supportive layers for lithium sorbent materials. Similarly, such permeable membranes or sheets can be arranged in any suitable fashion that permits introduction of a brine to one side of the permeable membrane or sheet and collection of material from an opposing side that is not in direct fluid communication with the brine. For example, permeable sheets can be provided as a device that includes layers of such sheets separated by spacers, where such spacers define one or more pairs of serpentine fluid paths bounded by the permeable sheets. Alternatively, permeable membranes can be provided as hollow tubes or fibers, which can be incorporated into a device that provides contact with a brine on either the interior or exterior surface of the tubular membrane and collection of material from the opposing side. Regardless of the particular configuration, it is especially preferred that the membranes have a low permeability for water to achieve higher separation factors and minimize potential feed dilution.

In a preferred embodiment of the inventive concept, a set of permeable membranes in the form of hollow fibers is provided within a housing, with the ends of the hollow fibers fluidically sealed to the ends of the housing (for example, by being set in a potting material, such as an epoxy resin). Such a housing can be provided with a fluid inlet and a fluid outlet that permit exposure of the outer surfaces of the hollow fibers to a desired liquid (for example, a brine), while the open ends of the hollow fibers at the ends of the housing provide access for a different fluid (for example, a stripping or extracting fluid) to the interior of the hollow fibers. Such an arrangement provides highly efficient transport of materials across the walls of the hollow fibers while being resistant to fouling and clogging.

In embodiments of the inventive concept, a lithium-selective sorbent is complexed with the material of a permeable sheet or membrane to produce a lithium sorbent membrane. Upon exposure of one side of such a lithium sorbent membrane to a lithium containing brine, lithium ions are adsorbed into the lithium sorbent membrane. Such adsorbed lithium is extracted from the opposite side of the lithium sorbent membrane by exposing it to a stripping solvent (for example, an aqueous solution) that contains a lower lithium concentration than that of the brine on the opposing side of the lithium sorbent membrane. It should be appreciated that the transfer of lithium ions across the lithium sorbent membrane is driven by the free energy change (i.e., free energy exchange), and is not a result of either ion exchange or elevated hydrostatic pressure applied to the membrane. Counterions (for example, chloride) can also move across the permeable membrane in order to provide charge balance. In use, a brine can be supplied to such a device as a flow over the outer surfaces of the lithium sorbent membranes while a stripping solvent flows through the interior of the lithium sorbent membranes. Such flows can be in the same direction (i.e. co-current) or in opposing (i.e., countercurrent) directions. It should be appreciated that since extraction of lithium is driven by the concentration gradient, high flow rates and elevated operating pressures are neither necessary nor desirable.

A number of parameters can be involved in providing an efficient process in which lithium sorbent membranes are used. One parameter is particle size, which can range from 20 nm to 1 µm or more. It should be appreciated that smaller particle sizes support the use of thinner membranes, which can improve permeation of lithium through the membrane. Another parameter is the concentration and distribution of lithium sorbent particles within a polymer matrix that forms part of a lithium sorbent membrane. A similar parameter can be the dispersion and concentration of alumina lithium intercalates within a permeable membrane (for example, a permeable ceramic or carbon layer). In either arrangement, loading of the lithium sorbent particles or lithium sorbent intercalates can range from 10% to 70% by weight. Yet another parameter is the pore size of the portion of the lithium sorbent membrane that is in direct contact with the brine. Such pore sizes can be less than 100 nm, 50 nm, 20 nm, 10 nm, or even less than 1 nm (for example, 0.4 nm to 0.7 nm). Such pore sizes will substantially prevent or minimize penetration of the coating solution into the porous support. A larger pore size will be useful in the event the particles are embedded in the support. Still other parameters are temperatures utilized in curing steps following production of a lithium sorbent membrane. These can range from about 60° C. to about 150° C., depending upon the properties of the polymer(s) utilized in lithium sorbent membrane production and/or the desired operating temperature of a system incorporating such a lithium sorbent membrane. For example, a lithium sorbent membrane intended for use in a system operating at a designated temperature can be subjected to a curing step at a temperature matching or exceeding the designated temperature prior to use.

The lithium sorbent composites described above, such as tubes, rods, or membranes, can be produced by a variety of methods, which can yield different functional geometries. In one embodiment, a lithium sorbent material (such as an alumina lithium intercalate) is prepared in the form of one or more particulates. The lithium sorbent material may be, for example, a lithium chloride intercalated aluminum hydroxide layer. Similarly, lithium chloride intercalated silica, lithium chloride transition metal oxides (such as titania, zirconia, hafnia, iron, cobalt, manganese, nickel, copper, silver, vanadium, niobium, tantalum, etc.) and rare earth oxides (such as yttria, ceria, lanthanum, etc.) can also be used, including mixtures of transition metal oxides. Once prepared, such lithium sorbent particles can be mixed with polymer precursors and applied to an existing permeable membrane or sheet. Suitable precursors include precursors for any of the polymers described above, such as precursors for polyvinyl chloride (PVC), polyvinylidene fluoride (PVDF), polyether ether ketone (PEEK), polyimide (PI), polyesters, polyamides, and polyethylenimine (PEI). Polymerization of the polymer precursors (for example, by UV irradiation, introduction of free radical sources, and/or introduction of cross linking agents) results in entrapment of the lithium sorbent particles in a polymer-stabilized layer associated with the permeable sheet or membrane to form a lithium sorbent membrane. The lithium sorbent particle content and polymer/cross linker composition, concentration, and/or ratio can be varied to adjust the lithium capacity, lithium release efficiency, and/or lithium selectivity of the resulting lithium sorbent membrane, where lithium selectivity is a measure of penetrance of other cations as determined by the formula below. In the case of a metal oxide support, the lithium sorbent particles can be mixed with a sol gel precursor. Alternatively, the sorbent particles can be coated onto the final produced support of any of the organic or inorganic compositions provided above.

Li Selectivity=([Li])/([Ca])

In the above equation, [Li] is lithium concentration and [Ca] is cation concentration in solution, for example, concentration of calcium, potassium, or sodium. An example of such a lithium sorbent membrane (105) is shown in FIG. 1. The lithium sorbent membrane 105 comprises an inner separative layer 103 and an outer support layer 101.

Such an approach can be used to generate a variety of lithium sorbent membrane geometries. In one embodiment, a layer of such polymer-stabilized lithium sorbent particles is deposited on one surface of a permeable membrane (for example, an external surface of a hollow fiber). In another embodiment, two or more layers of polymer-stabilized lithium sorbent particles are deposited sequentially on the same surface of a permeable membrane to produce a multilamellar lithium sorbent membrane. In such embodiments, successive layers of polymer-stabilized lithium sorbent particles can have substantially the same composition. Alternatively, in other embodiments successive layers of polymer-stabilized lithium sorbent particles of a multilamellar membrane can have different compositions (for example, different particle sizes, concentrations, and/or compositions). In still other embodiments, such layers of polymer-stabilized lithium sorbent particles can be applied to both sides of a permeable membrane (for example, to both exterior and interior surfaces of a hollow fiber). In such embodiments, either one or both surfaces of the permeable sheet or membrane can include two or more layers of polymer-stabilized lithium sorbent particles.

In another embodiment, a lithium selective composite membrane can be produced by producing a lithium sorbent composition (for example, an alumina lithium intercalate) within an existing permeable membrane or sheet. In such an embodiment, one or more precursors of a lithium sorbent composition can be introduced to a permeable membrane or sheet, then conditions can be adjusted (for example, by providing an additional precursor, altering pH, altering temperature, altering ionic strength, etc.) to cause the formation of a lithium sorbent composition in situ within the material of the permeable membrane or sheet. For example, a permeable membrane (for example, a hollow fiber) can be exposed to a mixture of alumina and LiOH (in proportions and under conditions suitable for forming an alumina lithium intercalate) that is flowed along one side of a permeable membrane (for example, the interior volume of a hollow fiber). In some embodiments, conditions can be selected to produce lithium sorbent particulates dimensioned to enter the material of the permeable membrane or sheet (for example, from about 1 nm to about 50 nm). Removal of unreacted and unretained materials provides a lithium sorbent membrane configured as a permeable membrane or sheet that is impregnated with a lithium sorbent composition. It should be appreciated that, in some embodiments, such impregnated lithium sorbent membranes can additionally be coated on either or both sides with one or more layers of polymer stabilized lithium sorbent particles, as described above.

In operation, one or more of such lithium sorbent membranes can be provided in a housing that includes at least two fluidically isolated paths, where such paths are joined for at least part of their length by a lithium sorbent membrane. Passage of a lithium-containing brine (for example, a geothermal brine) along a brine fluid path and a stripping solution along an adjacent stripping fluid path that is coupled to the brine fluid path by a lithium sorbent membrane results in the continuous extraction of lithium from the brine and transfer of the removed lithium to the stripping fluid. As used herein, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. In some embodiments, the stripping fluid is an aqueous fluid having a lower lithium content than that of the brine. Since energy for the transfer of lithium across the lithium sorbent membrane is a function of the free energy represented by the concentration gradient across the lithium sorbent membrane, the process can take place in the absence of elevated pressure (for example, as used in ultrafiltration technologies). Similarly, since lithium transfer is not accomplished by ion exchange, the process can take place in the absence of an eluting and/or regenerating step(s). This advantageously simplifies the lithium extraction process and dramatically reduces equipment and power requirements. In some embodiments of the inventive concept, power can be provided from geothermal energy supplied by the source of a geothermal brine that is being processed for lithium extraction.

In another aspect, the invention is directed to an apparatus for the selective recovery of a lithium salt from an aqueous source solution containing a lithium salt. The apparatus includes, at minimum, any of the lithium extraction composite embodiments described above (e.g., membrane, rod, or tube) and one or more pumps in fluid communication with the lithium extraction composite. Generally, the lithium extraction composite includes one, two, or more fluid paths to accommodate flow of the aqueous source solution and/or stripping solution. In particular embodiments, the apparatus includes: a membrane extraction unit comprising a first fluid path, a second fluid path, and a lithium extraction membrane interposed between the first fluid path and the second fluid path, wherein the unit permits transport of lithium salt between the first fluid path and the second fluid path, wherein the lithium extraction membrane includes a support, as described above, on which particles of a lithium-selective sorbent material are coated; a first pump in fluid communication with the first fluid path and positioned to induce a first flow of the lithium containing brine along the first fluid path; and a second pump in fluid communication with the second fluid path and positioned to induce a second flow of the stripping solution along the second fluid path.

In yet another aspect, the present disclosure is directed to a system (unit) for selective recovery of lithium from a lithium containing brine. The system includes a lithium extraction composite containing a first fluid path, a second fluid path, and a lithium sorbent between the fluid paths, or in the specific case of a membrane extraction unit, a lithium sorbent membrane interposed between the first fluid path and the second fluid path. The unit permits transport of lithium salt between the first fluid path and the second fluid path. The system also includes a source of the lithium-containing brine in fluid communication with the first fluid path; a first pump in fluid communication with the first fluid path and positioned to induce a first flow of the lithium containing brine along the first fluid path; a source of a stripping fluid in fluid communication with the second fluid path; and a second pump in fluid communication with the second fluid path and positioned to induce a second flow of the stripping solution along the second fluid path. In some embodiments of the system (or method), the first fluid path and the second fluid path are co-current along the lithium sorbent membrane or other lithium extraction composite. In other embodiments of the system (or method), the first fluid path and the second fluid path are countercurrent along the lithium sorbent membrane or other lithium extraction composite. In some embodiments of the system, the first pump does not apply significant (or any) hydrostatic pressure, or the first flow is applied at a lower hydrostatic pressure than the second flow.

In some embodiments, the present disclosure is directed to a lithium selective membrane comprising: a first lithium extractant (sorbent); and a permeable membrane, wherein the extractant is coupled to the permeable membrane. In some embodiments, the permeable membrane is configured as at least one hollow fiber. In further embodiments, the first lithium extractant is or includes lithium sorbent particles, such as particles of a lithium alumina intercalate. The first lithium extractant may, in some embodiments, be formed via in situ synthesis within the permeable membrane. The lithium selective membrane may also include a first stabilizing polymer. In some embodiments, the lithium selective membrane further includes a surface and a first layer, wherein the first layer includes the first lithium extractant incorporated in the first stabilizing polymer, and wherein the first layer is coupled to the surface. In further embodiments, the lithium selective membrane further includes a second layer, wherein the second layer includes a second lithium extractant incorporated in a second stabilizing polymer, and wherein the second layer is coupled to the first layer. In some embodiments, the second layer is not identical to (i.e., is different from) the first layer. In some embodiments, the surface is an outer surface or inner surface of the permeable membrane.

In other embodiments, the present invention is directed to a membrane extraction unit for recovering lithium from brines, comprising: a first fluid path that is in fluid communication with a brine feed; a second fluid path that is in fluid communication with a stripping fluid; and a lithium sorbent membrane interposed between the first fluid path and the second fluid path so as to permit transport of lithium from the brine feed to the stripping fluid. The membrane extraction unit may further include a housing, wherein the housing includes a first inlet and a first outlet that are in fluid communication with the first fluid path, and a second inlet and a second outlet that are in fluid communication with the second fluid path. In some embodiments, the lithium sorbent membrane is configured as at least one hollow fiber, wherein the at least one hollow fiber includes an external surface that is in contact with the first fluid path, and wherein the lithium sorbent membrane further includes an interior lumen that is in fluid communication with the second fluid path.

In other embodiments, the present invention is directed to a method for selectively transferring lithium from a lithium-containing brine, the method comprising: providing a lithium sorbent membrane (e.g., containing an alumina lithium intercalate) having a first surface and a second surface; establishing a first flow of the lithium-containing brine over the first surface; establishing a second flow of a stripping solution over the second surface; and recovering lithium from the stripping solution. In some embodiments, an initial lithium concentration of the stripping solution is lower than a lithium concentration of the lithium-containing brine. In some embodiments, the first flow is co-current with the second flow, while in other embodiments, the first flow is countercurrent to the second flow. In some embodiments, the first flow is not applied at a significant hydrostatic pressure, or the first flow is applied at a lower hydrostatic pressure than the second flow.

Examples have been set forth below for the purpose of illustration and to describe certain specific embodiments of the invention. However, the scope of this invention is not to be in any way limited by the examples set forth herein.

EXAMPLES

Preparation of a Composite Hollow Fiber Filter Membrane

Figure 2:
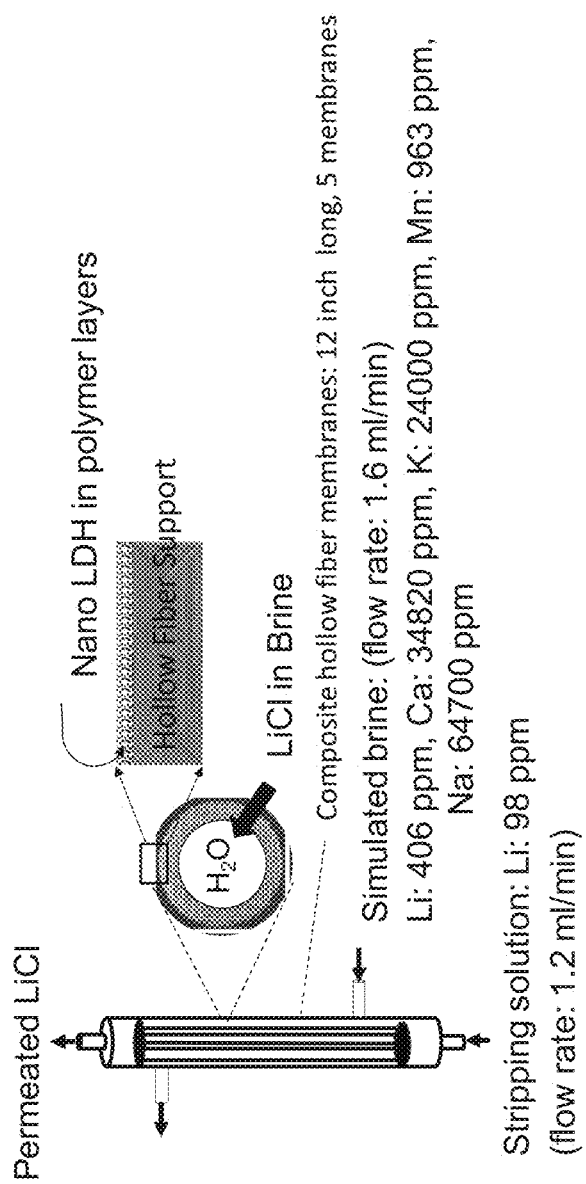
FIG. 2 is a drawing of an exemplary geometry of hollow fibers produced as described herein.
Figure 3:
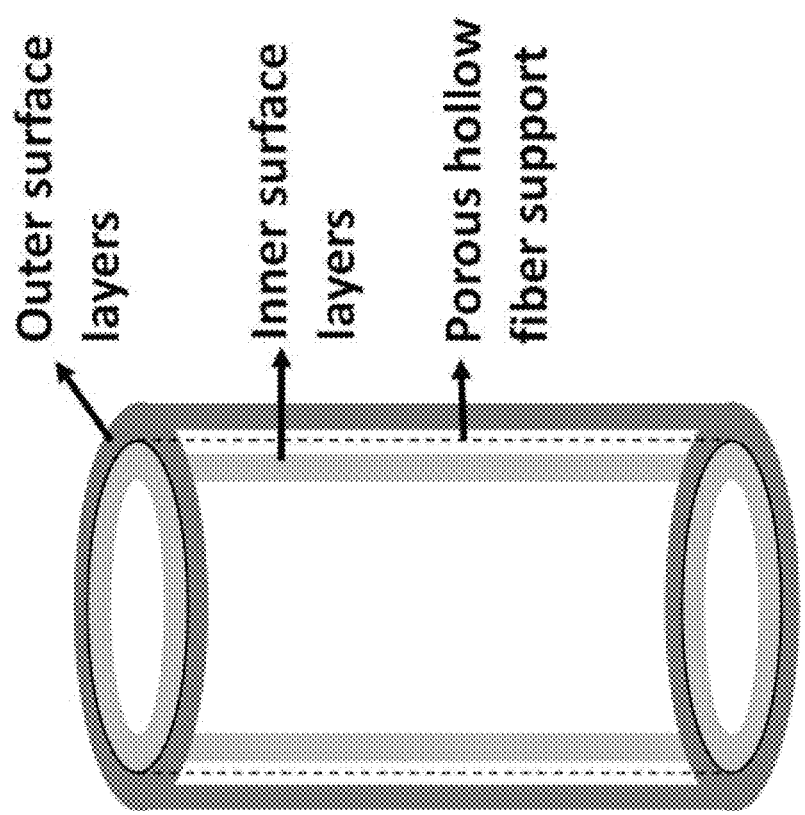
FIG. 3 is a drawing of an exemplary system for extraction of lithium from a brine using a hollow fiber filter module incorporating a porous hollow fiber support along with inner and outer surface layers of lithium sorbent material.

A mixture of gibbsite $Al(OH)_3$ (10 to 20 nm) was mixed with LiOH, with 10 to 20 percent excess LiOH, as a one-to-one molar ratio in water to form a mixture with a one-to-two molar ratio of Li to Al. The mixture was neutralized with HCl at ambient temperature to form alumina lithium intercalate. PVDF in aqueous solution was added to the suspension, along with a cross-linking agent (Picassian® XL-702). Coating of hollow fibers was achieved by submerging the fibers in this mixture and then allowing the fibers to air dry at 115° C. for 1 hour. Coated hollow fibers were subsequently potted into conventional hollow fiber filter housings to give a hollow fiber filter module. An example of a geometry of hollow fibers produced in this fashion is shown in FIG. 2. An example of a system for extraction of lithium from a brine using a hollow fiber filter module incorporating such fibers is shown in FIG. 3.

Preparation of Double Layered Hollow Fiber Filter Membranes

Double layered hollow fiber filter membranes were prepared using a method similar to that detailed above. A stock solution of nanoparticle lithium aluminum double hydroxide chloride (LDH) was prepared as above as a 70% LDH by weight suspension, with the remainder of the stock solution being PVDF in aqueous solution and cross-linking agent (XL-702). The stock solution was diluted to provide a first layer coating at 23% PVDF/XL-702 and a second layer coating at 10% PVDF/XL-702. Such a double layered hollow fiber filter can be operated at a temperature of about 40° C. to 150° C.

In Situ Preparation of Lithium Sorbent Membranes by an Interfacial Microfluidic Method PVDF hollow fibers were modified by an interfacial microfluidic method using aluminum chloride ($AlCl_3$) and lithium hydroxide (LiOH). The aluminum hydroxide ($Al(OH)_3$) that is precipitated is based on a co-precipitation method at high supersaturation. As in a typical process, a 0.05M $AlCl_3$ solution was flowed through the lumen (interior) portion of the hollow fiber at a flow rate less than 1 mL/min (or at a flow rate of 1-10 ml/L) for about 1 hour. A 0.1M LiOH solution was then introduced to the shell (outer) portion of the fiber in the absence of flow. This was accomplished by providing the hollow fiber(s) in a housing that has a large volume relative to the hollow fiber volume, making a flow of the LiOH solution unnecessary. Diffusion of LiOH through the wall of the hollow fiber brings the reactants into contact.

A typical process was carried out by flowing the $AlCl_3$ solution within the hollow fiber lumen with the LiOH solution on the exterior side of the hollow fiber for about 24 hours at ambient temperature. This was followed by rinsing the hollow fiber on both the lumen side and exterior side with a saturated sodium chloride solution containing Li at 500 mg/kg and then drying at 40° C. for about 3 days.

Extraction of Lithium From Brines Using a Hollow Fiber Filter Cartridge

Typical extraction arrangement and extraction conditions are shown in FIG. 3. A brine solution was pumped over the outer surface of the hollow fibers at a relatively low flow rate and without the application of significant hydrostatic pressure (i.e., without sufficient hydrostatic pressure to result in transfer of materials across an untreated membrane). A stripping solution containing a lower lithium concentration than that of the brine was passed through the interior of the hollow fibers and received lithium ions transferred from the brine via the lithium sorbent membranes. Although the flows are shown as being co-current, countercurrent flows can also be used.

Figures 4A, 4B:
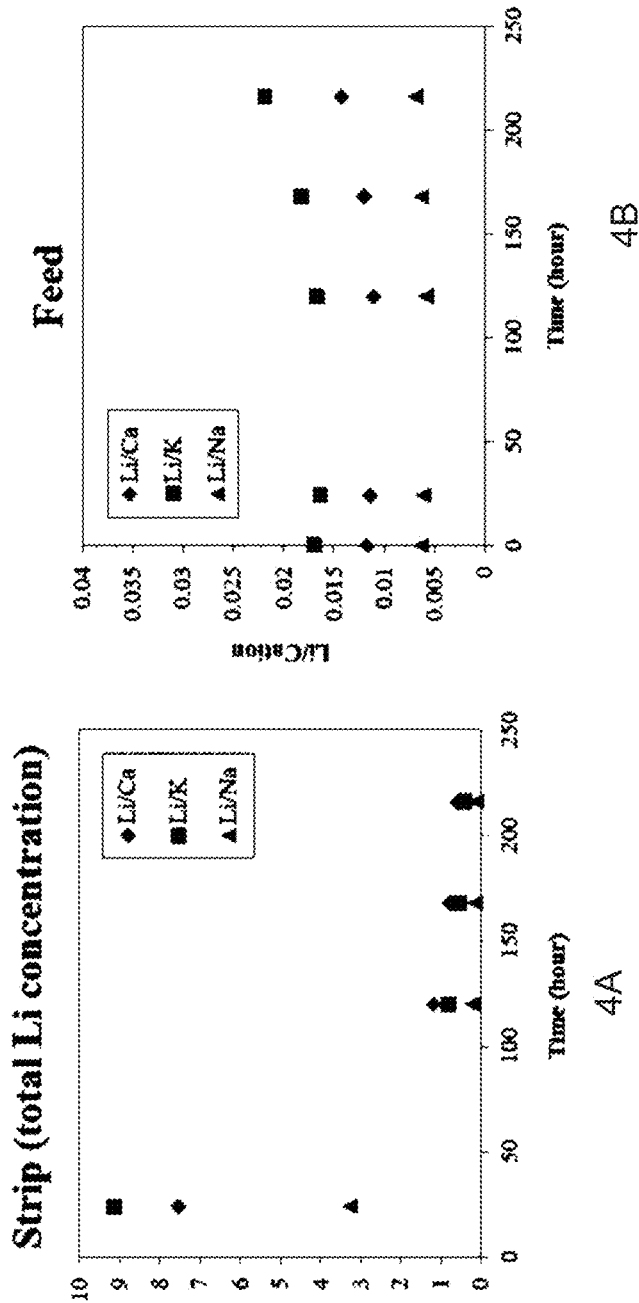
FIGS. 4A and 4B are graphs showing the ratio of lithium to calcium, potassium and sodium in strip (FIG. 4A) and feed (FIG. 4B) solutions as a function of time.
Figure 5:
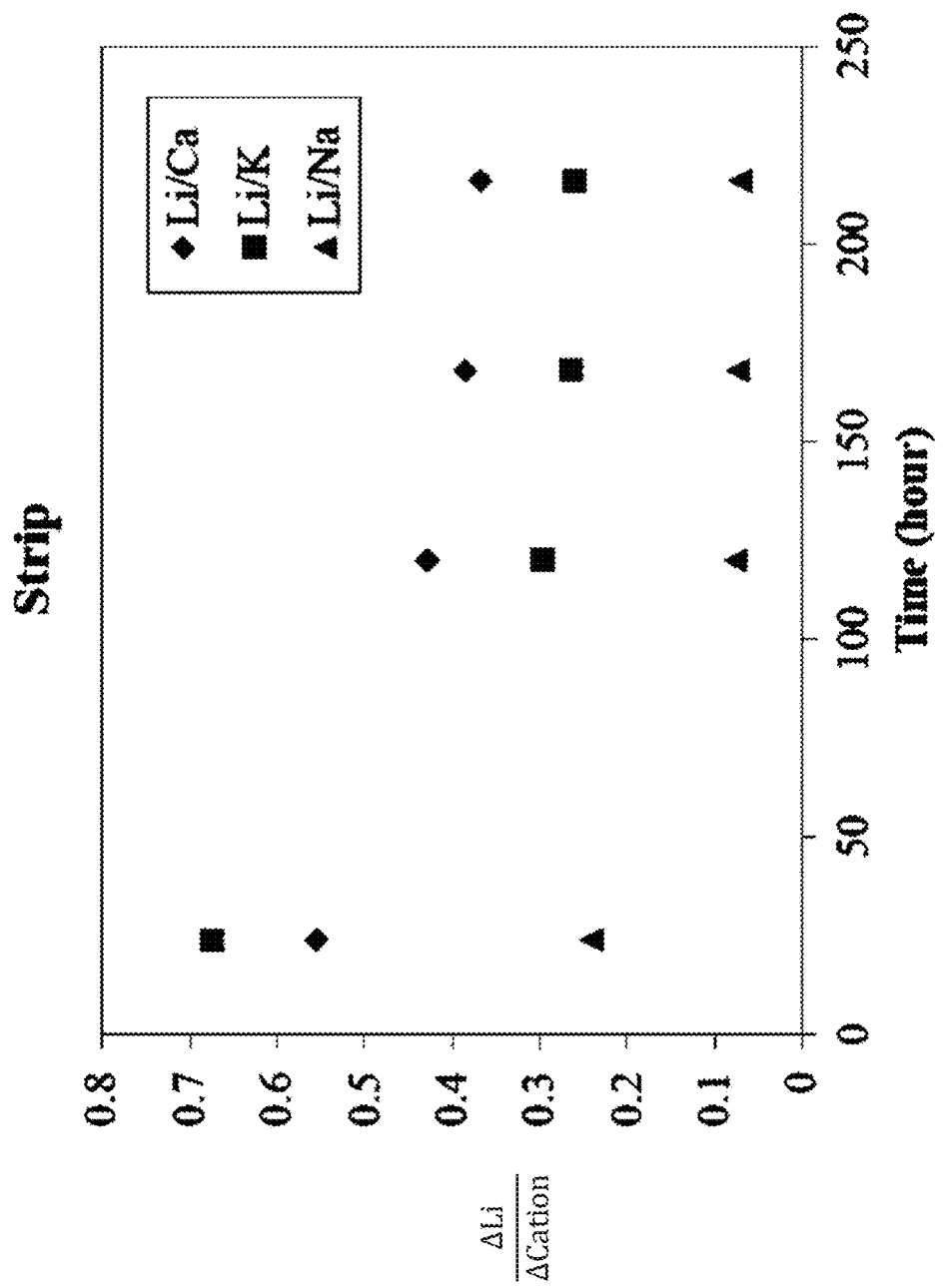
FIG. 5 is a graph showing the change in concentration of ratio of lithium to calcium, potassium and sodium in the strip solution over time, with the initial concentration of lithium in the stripping solution subtracted.

Results from such an arrangement are shown in the graphs in FIGS. 4A and 4B, which show the ratio of lithium ion concentration to concentration of other cations (e.g., calcium, potassium, and sodium) in both strip solution and feed (i.e. brine) as a function of time, respectively. Selective extraction of lithium is evident. FIG. 5 is a graph showing the ratio of change in concentration of lithium to calcium, potassium, and sodium in the strip solution over time, with the initial concentration of lithium in the stripping solution subtracted. From such data, a separation factor can be calculated. The formula used for calculating the separation factor is provided in the equation below:

$$\text{Li Separation Factor} = \frac{\left(\frac{[Li]_s}{[Ca]_s}\right)}{\left(\frac{[Li]_f}{[Ca]_f}\right)}$$

where Ca is cation, s is stripping solution, and f is feed.

Figure 6:
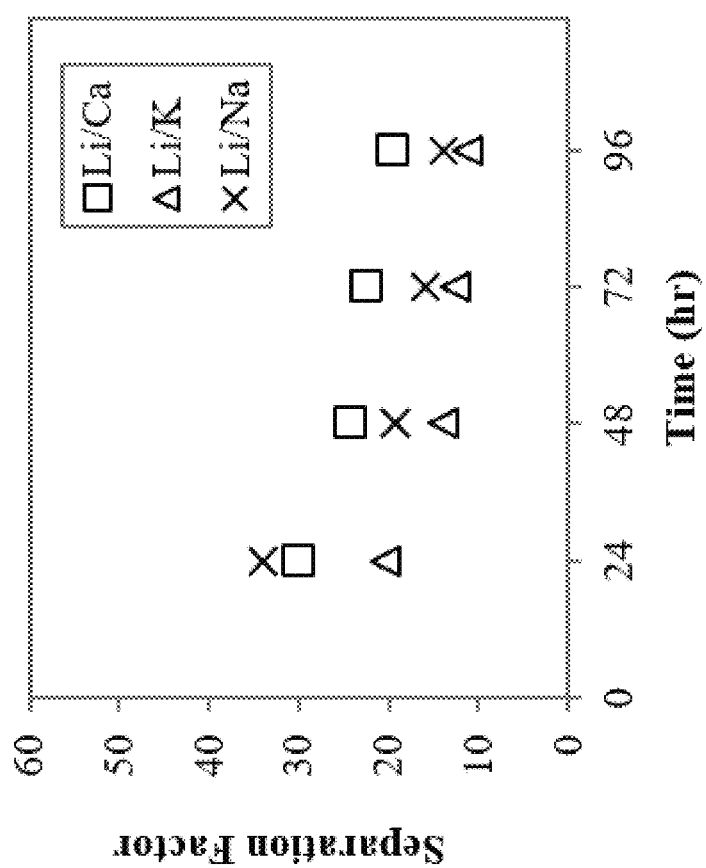
FIG. 6 is a graph showing the change in separation factor for lithium for a hollow fiber cartridge module.

The change in separation factor for lithium for such a hollow fiber cartridge module is shown in FIG. 6. Recovery of approximately 80% of the available lithium from the brine was observed. Selective transport across the lithium sorbent membrane is evident, with significant separation factors being realized despite the presence of large molar excesses of Ca, K, and Na in the feed brine solution.

Optimization of Polymer and Cross Linking Agent Content

In an effort to improve lithium selectivity, the supporting polymer formulation was modified by varying the amount of acrylic resin (as Elvacite® 2009) and cross-linking agent (polycarbodiimide cross linker, XL-702) in the coating solution.

The synthesis of nano-LDH was achieved by mixing nanoparticle gibbsite with LiOH in $H_2O$ for 24 hours, followed by a neutralization step using HCl. N-methyl-2-pyrrolidone (NMP) was added to the resulting neutralized $LiCl/Al(OH)_3$ (i.e. LDH) solution, which was then heated to about 100° C. to evaporate water from the coating solution. Polyvinylidene (PVDF) and polyvinylpyrrolidone (PVP, MW:58,000) were mixed in the resulting LDH solution. An acrylic resin (50% by weight of polymer) was separately dissolved in NMP and then added into the coating solution. Finally, a polycarbodiimide crosslinker (10% of acrylic resin) was added into the mixture. Addition of acrylic resin and crosslinker in the coating solution, as described above, permitted the incorporation of a higher percentage of nano-LDH loading in the membrane (70% by weight).

Figure 7:
FIG. 7 is a photomicrograph of a resulting composite membrane that contains 70% lithium aluminum double hydroxide chloride (LDH).
Figures 8A, 8B:
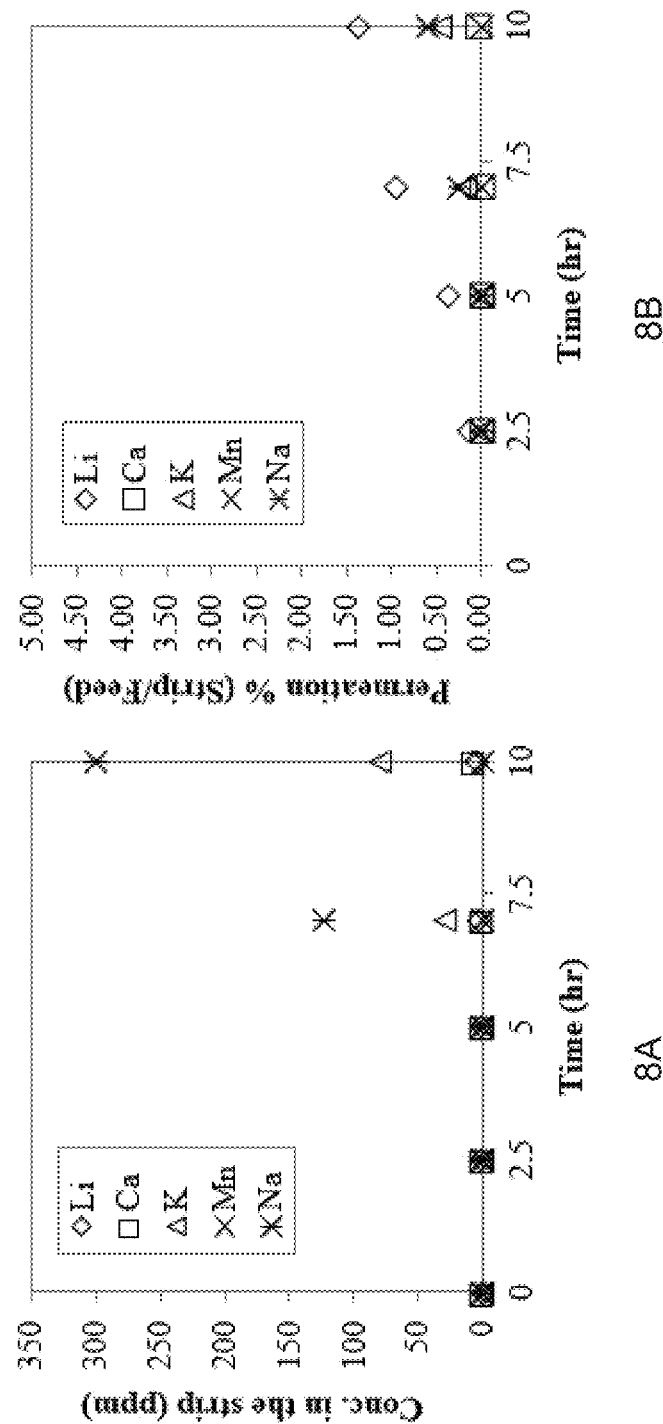
FIG. 8A is a graph showing the concentration in the stripping solution of lithium and the other cations via a membrane module.
FIG. 8B is a graph showing the permeation of lithium and the other cations via a membrane module.

FIG. 7 shows a photomicrograph of a resulting composite membrane that contains 70% LDH. The thickness of the coated layer was about 20 µm. The permeation of lithium and the other cations via a membrane module (4" in length and including 50 of such lithium sorbent hollow fiber membranes) is shown in FIGS. 8A and 8B. Specifically, FIG. 8A is a graph showing the concentration in the stripping solution of lithium and the other cations via a membrane module, and FIG. 8B is a graph showing the permeation of lithium and the other cations via a membrane module.

Figures 9A, 9B:
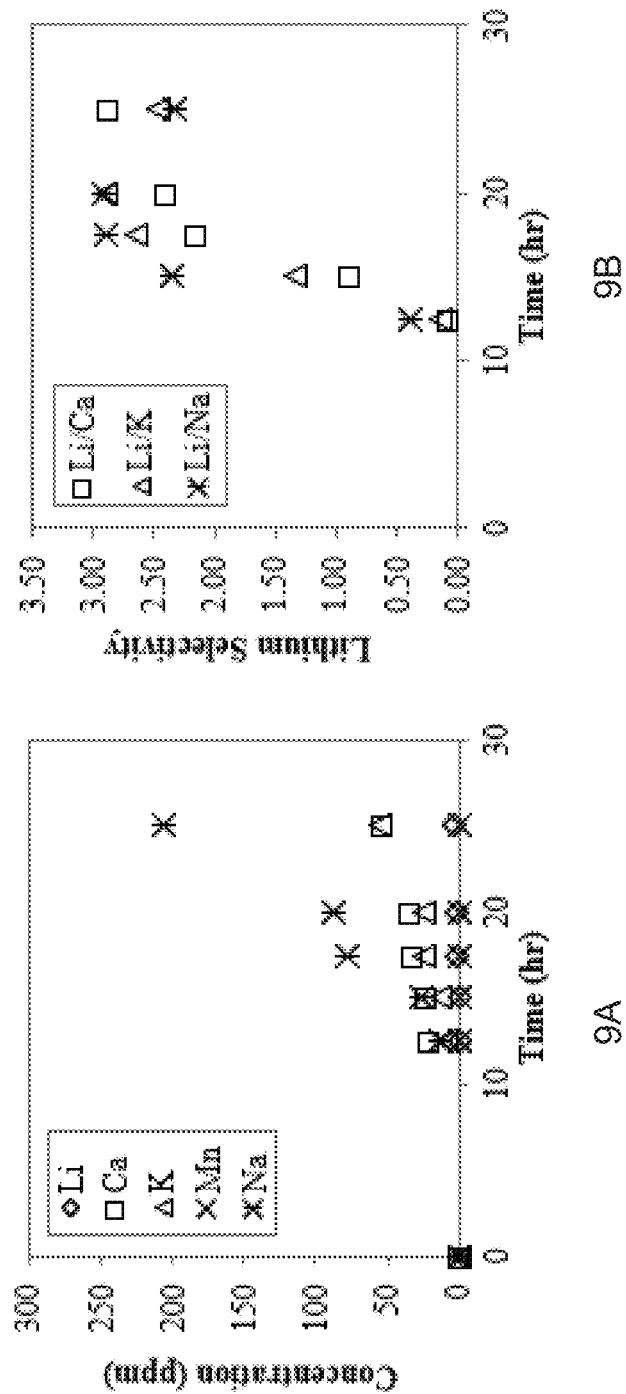
FIGS. 9A and 9B are graphs showing the results of cation permeations through composite lithium sorbent membranes and the lithium selectivity.
Figures 10A, 10B:
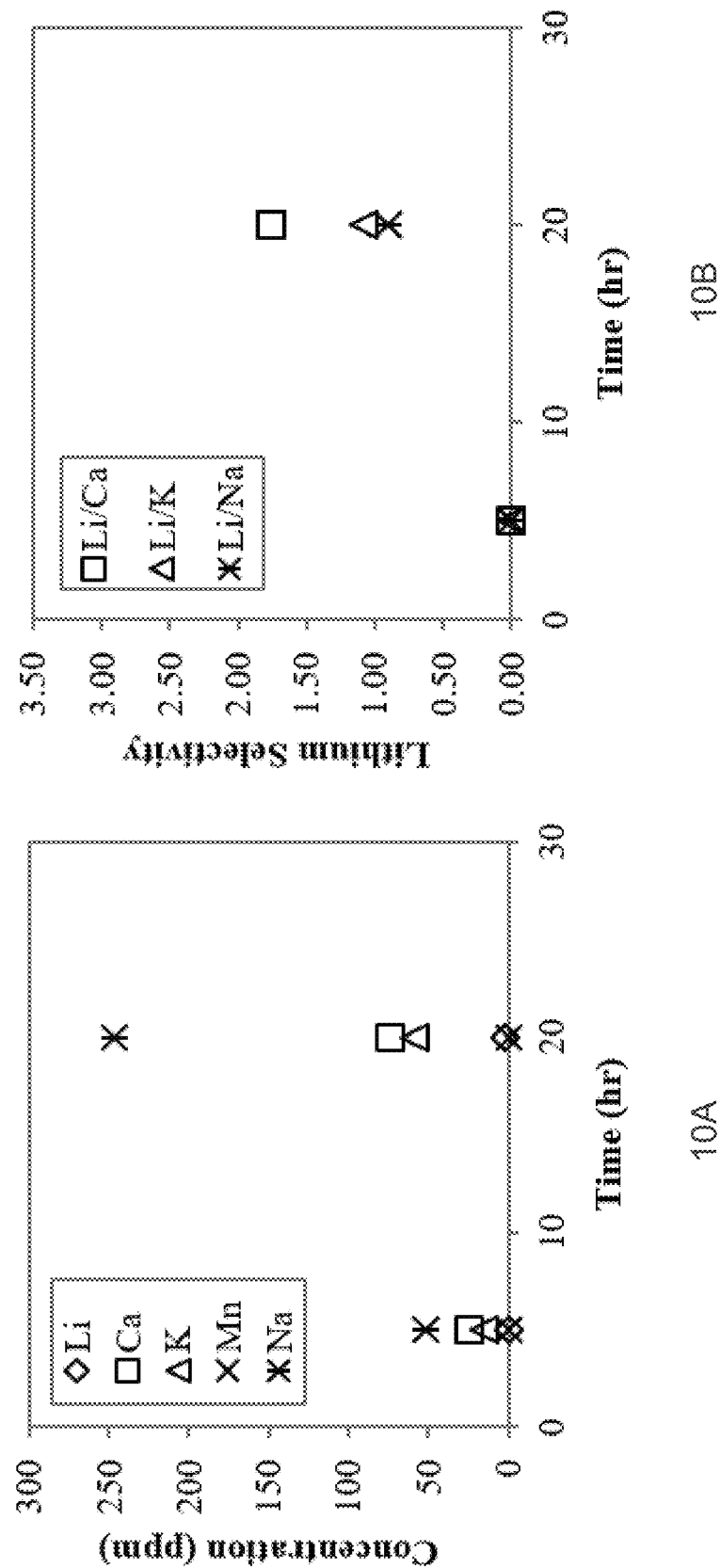
FIGS. 10A and 10B are graphs showing the results of cation permeations through composite lithium sorbent membranes.

The amounts of acrylic resin and crosslinker were varied to determine the effect on lithium permeation rate and selectivity, while maintaining good adhesion of LDH to the hollow fiber supports. In order to accelerate the evaluation of composite membranes with different composition of crosslinking agents, the number of lithium sorbent hollow fibers was reduced (typically about 3) and a 12-inch long filtration module was utilized. FIGS. 9A and 9B are graphs showing the results of cation permeation through composite lithium sorbent membranes comprising 25% acrylic resin and 5% crosslinking agent. FIG. 9A shows the concentration of Li, Na, Ca, Mn, and K with time. FIG. 9B shows the ratio of Li to other cations in the strip. FIGS. 10A and 10B are graphs showing the results of cation permeations through composite lithium sorbent membranes containing 10% acrylic resin and 2.5% crosslinking agent. The lithium selectivity was higher in the lithium sorbent membranes comprising 25% acrylic resin and 5% crosslinking agent. FIG. 10A shows the concentration of Li, Na, Ca, Mn, and K with time. FIG. 10B shows the ratio of Li to other cations in the strip.

Performance of Lithium Sorbent Membranes with In Situ Generated LDH

Figure 11:
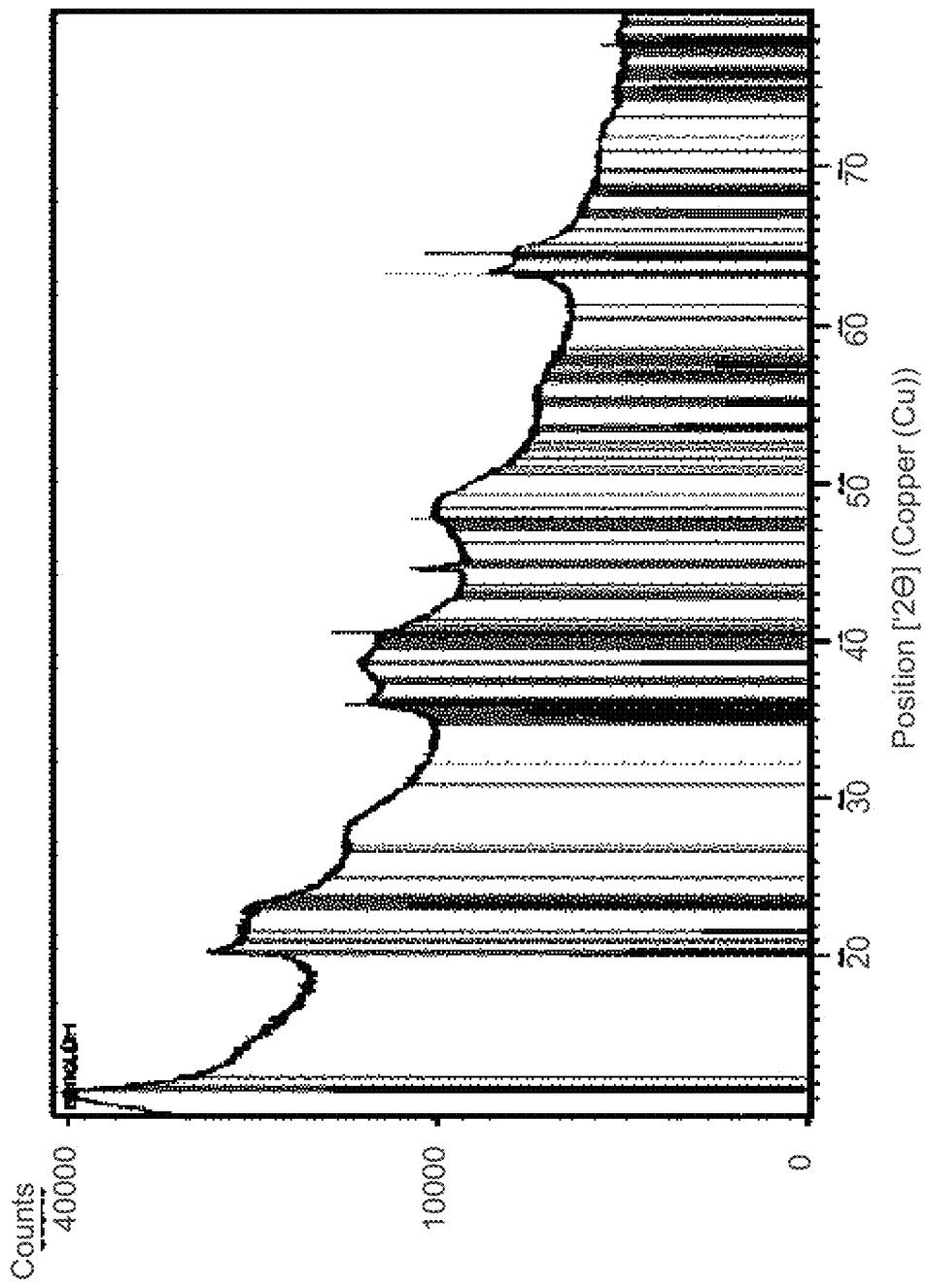
FIG. 11 is an XRD pattern of LDH synthesized within hollow fibers by performing an in situ LDH synthesis process.
Figures 12A, 12B:
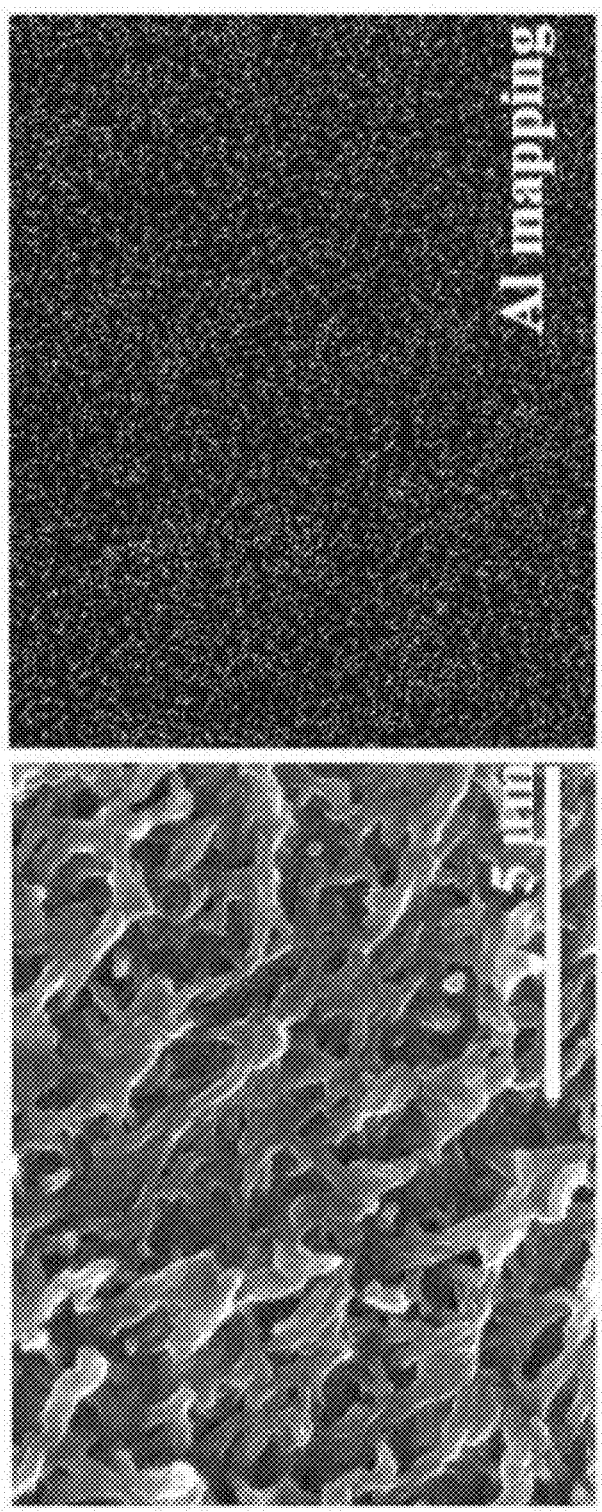
FIG. 12A is a micrograph of the cross-section of microporous hollow fibers impregnated with LDH synthesized in situ.
FIG. 12B is the micrograph with SEM-EDX (Al mapping) analysis.

In situ LDH synthesis was accomplished by circulating a reaction solution containing gibbsite and lithium hydroxide for 24 hours at 60° C. to 95° C. through a CPVC or PDF housing in which hollow PVDF fiber filters were placed. Hollow fiber filters were pre-treated by placement in boiling water for about 1 hour in order to improve thermal stability at elevated temperatures. The LDH-impregnated hollow fibers were then coated with a solution comprising 5% acrylic resin and 1% crosslinking agent. The resulting membranes were dried at ambient temperature for two hours, and then cured at 90° C. to 150° C. for 1 hour. Cured lithium sorbent hollow fibers were potted in a PDF housing (12 inches in length, 1 inch in diameter) using an epoxy resin (as BONDiT™ B-45). FIG. 11 shows an X-ray diffraction (XRD) pattern of LDH synthesized within the hollow fibers by performing an in situ LDH synthesis process within such hollow fibers. The XRD pattern corresponds to the peaks for nano LDH, which confirms that the synthesized LDH is a nanocrystalline form of high purity. FIGS. 12A and 12B are graphs showing results of a scanning electron microscopy with energy dispersive X-ray spectroscopy (SEM-EDX) analysis of the cross-section of microporous hollow fibers impregnated with LDH synthesized by the in situ method. Specifically, FIG. 12A is a micrograph of the cross-section of microporous hollow fibers impregnated with LDH synthesized in situ, while FIG. 12B is the micrograph with SEM-EDX (Al mapping) analysis. The uniform distribution of Al throughout the cross-section of the hollow fiber in FIG. 12B indicates that LDH was uniformly distributed within the hollow fiber support.

Figures 13A, 13B:
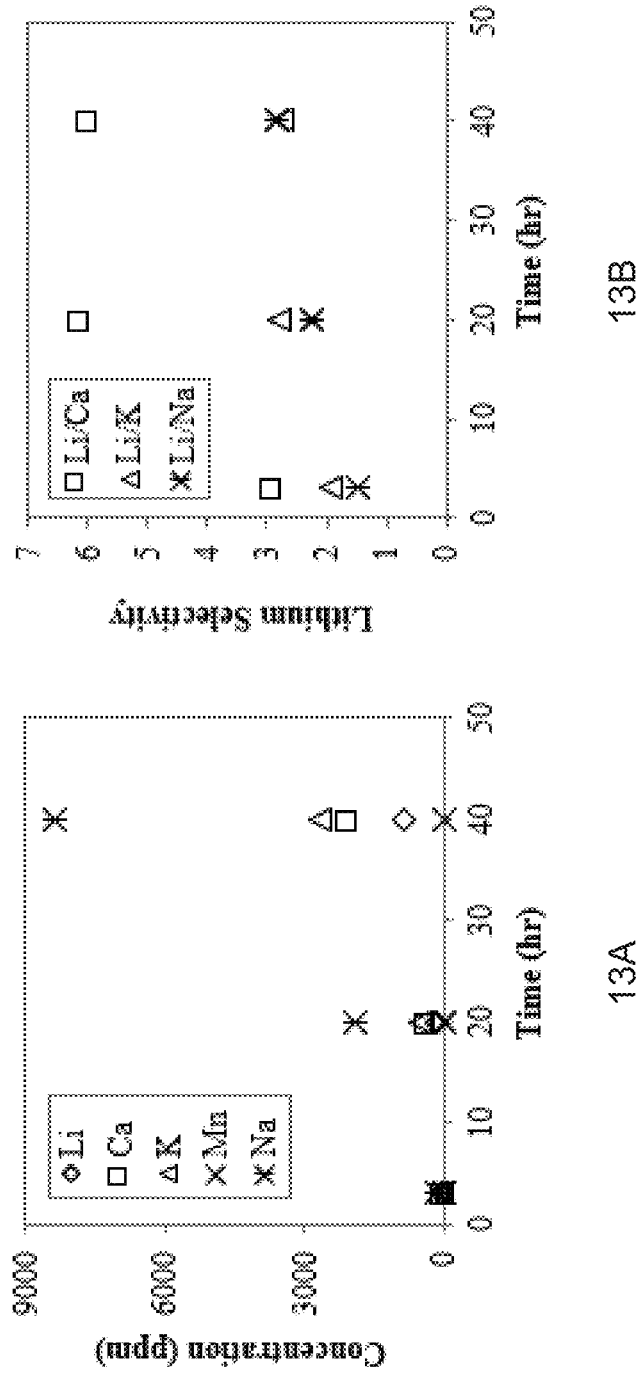
FIGS. 13A and 13B are graphs showing cation permeation and lithium selectivity of composite membranes over a run time of 40 hours.

FIGS. 13A and 13B are graphs showing the results of one set of studies of cation permeation and lithium selectivity of the resulting composite membranes for the strip stream over a run time of 40 hours. Specifically, FIG. 13A shows the concentration of Li, Na, Ca, Mn and K with time, while FIG. 13B shows the ratio of Li to the other cations in the strip. The lithium concentration in the strip after 40 hours was 135 ppm and the ratio of lithium concentration in the strip to the feed in 40 hours was 0.44. The lithium selectivity over calcium was about 6:1 and the selectivity over potassium and sodium was about 2.5:1. The lithium permeation rate through the composite hollow fiber membranes was 0.039 mg/cm$^2$/hr. This suggests that higher loading of LDH in hollow fiber supports results in higher capacity for recovery of lithium from brine solution. Notably, a typical 1" diameter membrane module containing about 200 hollow fibers (12" long) permits complete recovery of lithium chloride in less than 3 hours from a 1 L simulated brine solution.

Figures 14A, 14B:
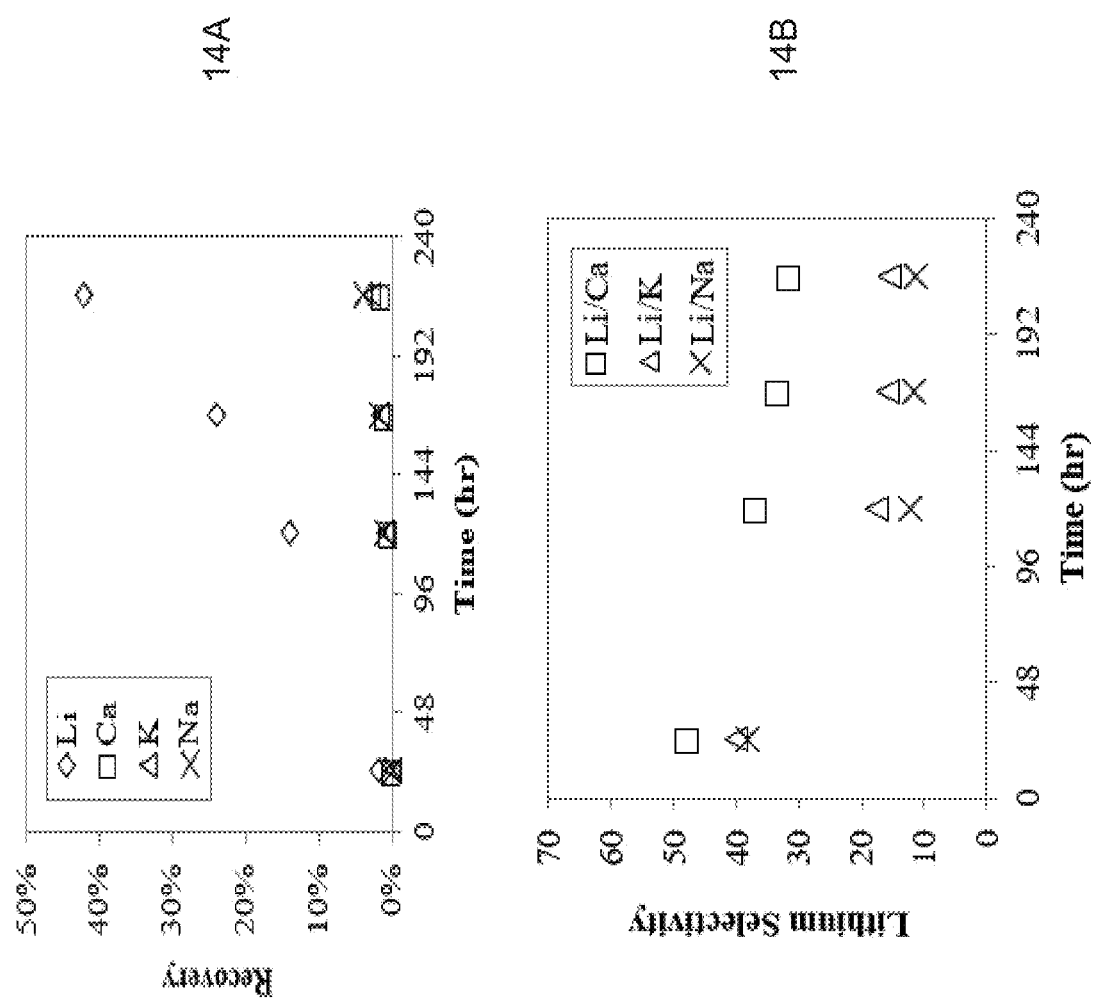
FIGS. 14A and 14B are graphs showing recovery and lithium selectivity of composite membranes over a run time of 240 hours.

FIGS. 14A and 14B are graphs showing the results of the strip stream for a second set of studies. Specifically, FIG. 14A shows the concentration of Li, Na, Ca, and K with time, while FIG. 14B shows the ratio of Li to other cations in the strip. In these studies, a simulated brine solution (comprising 406 ppm Li, 64700 ppm Na, 24000 ppm K, 32820 ppm Ca, 963 ppm Mn) was supplied into the exterior side of the lithium sorbent membranes (with 1018 100 fibers) and the stripping solution containing 500 ppm LiCl was introduced into the interior (lumen) side of the lithium sorbent membranes. The temperature of simulated brine in the membrane module was maintained at the desired level (up to 90° C.) throughout the operating period. Both the feed and strip solutions were continuously circulated through the membrane module with peristaltic pumps at flow rates of 15 mL/min and 2 mL/min, respectively. The feed volume was 1 L and the strip volume varied from 250 mL to 1 L. Samples of 5 mL were collected every few hours from both feed and strip solutions for inductively coupled plasma-optical emission spectrometry (ICP-OES) analysis. The extraction process with the composite membrane module was conducted for over 200 hours.

Modulation of the Wetting Characteristics of Lithium Sorbent Membranes

The wetting characteristics of lithium sorbent membranes of the inventive concept can be modulated by modifying the hydrophilicity of the surface, for example, by incorporating a polymer (such as polyvinylpyrrolidone, i.e. PVP).

Module 1: A composite composed of lithium aluminate (LiAlO$_2$) as a sorbent was coated on the outer surface of PVDF hollow fibers to produce lithium sorbent membranes. The PVDF hollow fibers were dipped in the coating solution containing LiAlO$_2$, PVDF (as Kynar® Powerflex™ LBG), and N-methyl-2-pyrrolidone (NMP) for a few seconds and then dried at room temperature for over 5 hours. The resulting hollow fiber membranes were cured at 130° C. for 1 hour. The hollow fiber ends were potted and enclosed in a housing with a high temperature epoxy. The final filter module contained 100 composite hollow fibers, and was installed in a lithium sorbent membrane extraction system in which a simulated brine solution was supplied as the feed and deionized water as the stripping solution. The temperature of both feed and stripping solution was kept at 95° C., and the flow rates of feed and stripping sides were maintained at 10.4 ml/min and 1.8 ml/min, respectively. Lithium extraction experiments using Module 1 were carried out for 5 hours. The concentration of Li in the stripping solution was determined by ICP-OES. After running the system for 5 hours, the amount of Li ion in the stripping solution was below detectable limits, which indicated that the LiAlO$_2$ composite membrane was relatively inefficient in extracting lithium from the brine solution. Not wishing to be bound by theory, it is believed that the relatively poor efficiency in the extraction of lithium by Module 1 could be attributed to a lack of hydrophilicity of the composite membranes, which prevented diffusion of Li ions into the polymer matrix.

Module 2: In order to increase the hydrophilicity of the composite membranes, a hydrophilic polymer, polyvinylpyrrolidone (PVP), was added to the coating solution during the fabrication of Module 2. The ratio of PVP (MW: 40,000) to PVDF in the solution was 1:3. A lithium aluminum double hydroxide, [LiAl$_2$(OH)$_6$]Cl•H$_2$O, (LDH) was used as the sorbent in Module 2 in place of lithium aluminate used in Module 1. Such an LDH is known to be capable of intercalating LiCl into the crystal structure, whereas lithium aluminate added in Module 1 is known to only adsorb lithium. Prior to use in the lithium extraction system, Module 2 was immersed in DI water for 24 hours to fully wet the membranes. Lithium extraction with Module 2 was conducted for 10 hours under the same conditions of temperature and flow rates as used with Module 1. The concentration of lithium in the stripping solution after the 10 hour run was measured by ICP-OES, and the measured lithium concentration in the stripping solution was 15 ppm. Without wishing to be bound by theory, it is believed that hydrophilicity of the composite membrane is essential for lithium ions to transfer through the membrane.

Module 3: It is known that low PVP molecular weight is associated with higher water permeation flux through hollow fibers. Therefore, PVP with a lower molecular weight (MW: 10,000) was used in the fabrication of Module 3 to enhance the hydrophilicity of the composite membrane. In addition, lithium chloride (LiCl) was added in the coating solution to play the role of initial seeding agent for intercalation with LiCl from brine solution. Prior to starting lithium extraction tests with simulated brine, Module 3 was immersed in the mixture of glycerol, DI water, and LiCl (with concentration of 6000 ppm) for 2 hours to fully wet the membranes. Module 3 was then thoroughly rinsed with DI water. The resulting filter module was then installed in an extraction system and was fed with deionized water into both the feed and stripping sides at 95° C. for 5 hours. The Li concentration in the stripping solution following this step was 19 ppm. This Li concentration was used as the initial Li concentration, as shown in FIGS. 14A and 14B. The lithium extraction experiment was then performed with the simulated brine feed for 20 hours under the same experimental conditions as the Module 1.

Figure 15:
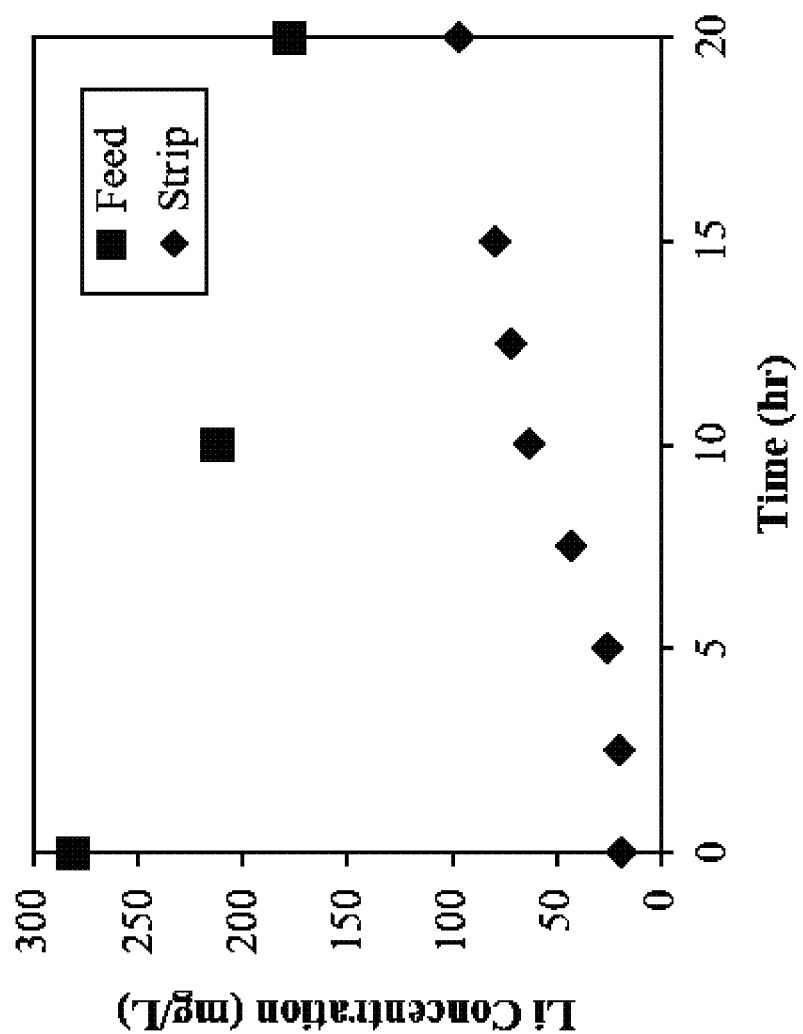
FIG. 15 is a graph showing the lithium concentration in the feed and strip solutions as measured by ICP-OES.

FIG. 15 is a graph showing the lithium concentration in the feed and strip solutions measured by ICP-OES. As shown in FIG. 15, the Li concentration in the feed decreased as the extraction time increased, whereas the Li concentration of the stripping solution increased up to 97 mg/L. This corresponds to a lithium recovery of 28%. Table 1 shows lithium selectivity relative to other cations present in the brine (for example, Ca, K, and Na).

TABLE 1

| Selectivity | | |
| --- | --- | --- |
| Li/Ca | Li/K | Li/Na |
| 18:1 | 17:1 | 6:1 |

As provided above in Table 1, the lithium selectivity ranged from 6:1 to 18:1. In view of the high selectivity for Li, it is believed that other cations may be present at substantially reduced concentration (<<5%) compared to the feed concentration. In order to confirm that lithium chloride was transported though the lithium sorbent membranes, chloride titration was conducted using the method provided in ASTM D512-1999. The total chloride concentration measured in the stripping solution after the 20 hour run was 34,301 ppm. This confirms that the composite lithium sorbent membrane is capable of transporting both lithium and chloride ions.

Fabrication of 70% LDH-30% Kynar®-PVDF/hydrophilic hollow fiber membrane modules and application for Li recovery from geothermal brine.

In a typical synthesis, initially the hydrophilic fibers were pretreated at 98° C. for 1 hour in water followed by overnight drying. Separately, about 20 g of gibbsite (particle size: 10-20 nm) and 5.38 g of lithium hydroxide were mixed in 800 mL water and stirred for about 1 hour. The solution was heated to ~95° C. and maintained there for about 4 hours followed by cooling to room temperature. The pH of this solution was slowly adjusted to 7 by dropwise addition of concentrated HCl. From this solution, about 100 mL was taken out and mixed with 3 g of Kynar®-PVDF solution (30 wt. % of LDH+Kynar®-PVDF) and 0.15 gm of XL702 binder (10 wt. % of Kynar®-PVDF). This solution was used to manually coat the inner side of hollow fibers using a syringe. Before the coating, PVDF hollow fibers were pre-treated by soaking them in water at 95° C. for 1 hour. The remaining 700 mL of LDH solution was mixed with 20.8 g Kynar® PVDF solution (30 wt. % of LDH+Kynar®-PVDF) and 2.4 g of XL702 binder (23 wt. % of Kynar®-PVD). This solution was then used to provide 3 coats on the outer wall of the fibers. To do this coating, fibers were mounted on a stand using fine metal wires. For each coat, the fibers were dipped into the solution for 1-2 minutes followed by 2 hour air drying on a rotating stand. After the last coat, the fibers were dried for 12-16 hours before they were cured at 115° C. for 1.5 hours with 1° C./min of heating and cooling rates. These cured fibers were coated again with one layer of only Kynar®-PVDF and cured again at 115° C. for 1.5 hours.

The fibers with final curing were then placed into a 12-inch PVDF tube and both the ends were potted using B45-TH epoxy (12-16 hour curing at room temperature for each end potting). The module fabrication was completed by making the end connections for tube and shell sides flows.

Figure 16A:
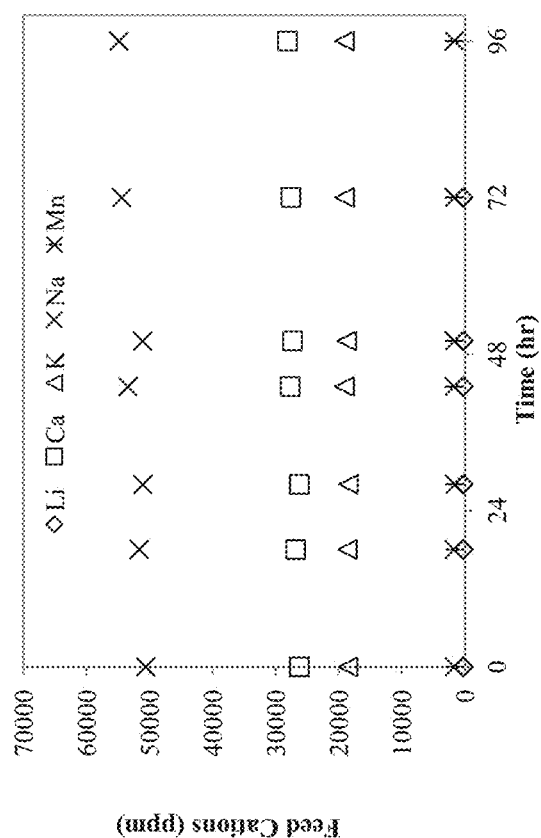
FIGS. 16A and 16B are graphs showing the results of Li extraction using a 70% LDH-30% PVDF-HP-1.5-115 membrane module (VD-P-91) at 80° C. using hydrophilic hollow fibers, where
Figure 16B:
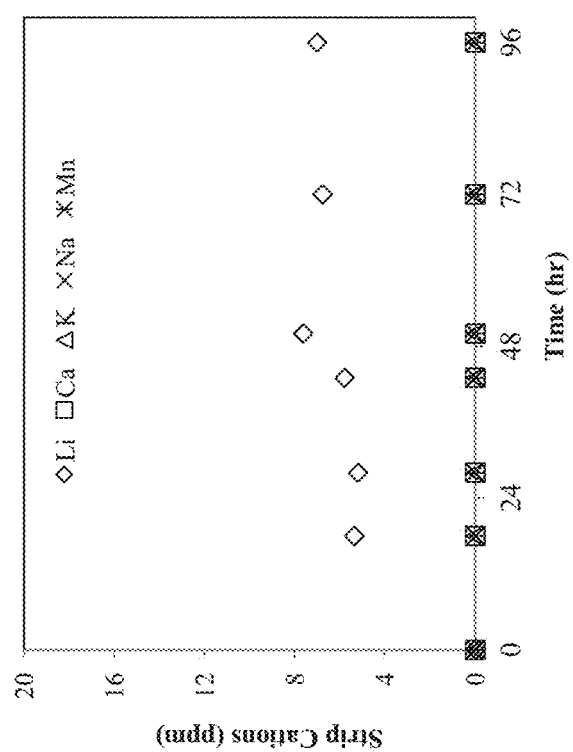

FIGS. 16A and 16B are graphs showing the results of Li extraction using the 70% LDH-30% PVDF-HP-1.5-115 membrane module (VD-P-91) at 80° C. using hydrophilic hollow fibers, where FIG. 16A shows the feed composition, and FIG. 16B shows the strip composition. (Feed: 750 mL simulated brine, Strip: 1125 mL~82 ppm Li in water). It was observed that only about 1.9% lithium was recovered in the first 18 hours, which increased only slightly up to 96 hrs of experiment. Similar results were also obtained for the new module (60 fibers) fabricated with the same batch. The number of fibers used were two times higher, which resulted in water transfer of about ~250 mL/day. It is herein surmised that since the aqueous Kynar®-PVDF solution is hydrophilic in nature, it has a better bonding/interaction characteristics with hydrophilic fibers compared to hydrophobic ones. This may be responsible for minimizing crack formation and resulted in improved Li extraction performance using hydrophilic fibers supported membranes. Another important modification made in the fabrication of these modules was the use of Kynar®-PVDF layer on top of LDH-Kynar®-PVDF mixed matrix membrane layer. The observed lower water transfer and better Li selectivity may be attributed to the combined effect of the hydrophilic nature of the fibers and use of the additional Kynar®-PVDF layer.

While there have been shown and described what are at present considered the preferred embodiments of the invention, those skilled in the art may make various changes and modifications which remain within the scope of the invention defined by the appended claims.

What is claimed is:

1. An apparatus for selective recovery of a lithium salt from an aqueous source solution containing said lithium salt, the apparatus comprising a lithium extraction composite and one or more pumps in fluid communication with the lithium extraction composite, wherein said lithium extraction composite comprises: (i) a porous support and (ii) particles of a lithium-selective sorbent material coated on at least one surface of the support, wherein said support has a porous planar membrane, porous fiber, or porous tubular shape;

wherein said lithium-selective sorbent material is a framework structure comprising LiX and M (OH)$_z$ units, wherein X is at least one anionic species selected from halide, nitrate, sulfate, carbonate, and bicarbonate; M is at least one oxophilic transition metal atom, and/or at least one oxophilic main group metal atom selected from aluminum, gallium, indium, silicon, germanium, and tin; and z is independently 2, 3, or 4, depending on the metal atom M; provided that, if M is exclusively aluminum, then the framework structure further includes M'(OH)$_z$ units, either in the same framework structure comprising LiX and M(OH)$_z$ units or in a separate framework structure comprising LiX and M'(OH)$_z$ units, wherein M' is at least one oxophilic transition metal atom and/or at least one oxophilic main group metal atom selected from gallium, indium, silicon, germanium, and tin.

2. The apparatus of claim 1, wherein said lithium extraction composite includes at least one fluid path to accommodate flow of an aqueous source solution and/or stripping solution.

3. The apparatus of claim 1, the apparatus comprising:
a membrane extraction unit comprising a first fluid path, a second fluid path, and a lithium extraction membrane interposed between the first fluid path and the second fluid path, wherein the unit permits transport of lithium between the first fluid path and the second fluid path, wherein said lithium extraction membrane comprises (i) a membrane support and (ii) particles of a lithium-selective sorbent material coated on at least one surface of the membrane support;
a first pump in fluid communication with the first fluid path and positioned to induce a first flow of the lithium containing brine along the first fluid path; and
a second pump in fluid communication with the second fluid path and positioned to induce a second flow of the stripping solution along the second fluid path.

4. The apparatus of claim 1, wherein said support is a polymer that has a melting point of at least 80° C.

5. The apparatus of claim 1, wherein said support has a melting point of at least 100° C.

6. The apparatus of claim 4, wherein said polymer is selected from the group consisting of polyimide, polyether ether ketone (PEEK), polybenzimidazole, ionomers, polysiloxanes, vinyl-addition polymers, polyurethanes, polyesters, polycarbonates, polyamides, polyethyleneimine (PEI), and copolymers, mixtures, and composites thereof.

7. The apparatus of claim 1, wherein said support has an inorganic composition.

8. The apparatus of claim 7, wherein said inorganic support has a metal oxide, metal carbide, metal nitride, or metal boride composition.

9. The apparatus of claim 7, wherein said inorganic support has an elemental carbon composition.

10. The apparatus of claim 1, wherein said lithium-selective sorbent material is selected from spinel-type lithium nickel cobalt manganese oxides (NCMs), lithium nickel cobalt aluminum oxides (NCAs), lithium manganese oxides (LMOs), and spinel-type lithium titanium oxides (LTOs).

11. The apparatus of claim 1, wherein said at least one anionic species X is selected from halide atoms.

12. The apparatus of claim 1, wherein said framework structure is represented by the following chemical formula:

$$\text{LiX:M1}_{x-y}\text{M2}_y(\text{OH})_3 \cdot n\text{H}_2\text{O} \tag{1}$$

wherein X is at least one anionic species selected from halide, nitrate, sulfate, carbonate, and bicarbonate; M1 is at least one oxophilic main group metal atom selected from aluminum, gallium, and indium; and M2 is at least one oxophilic transition metal atom, and/or at least one oxophilic main group metal atom selected from aluminum, gallium, indium, silicon, germanium, and tin, provided that M1 and M2 are different; x is at least 1 and up to 1.5; y is at least 0.1x and less than x; n is ≤4, and the species Li, X, M1, and M2 in Formula (1) are within a framework structure.

13. An apparatus for selective recovery of a lithium salt from an aqueous source solution containing said lithium salt, the apparatus comprising a lithium extraction composite and one or more pumps in fluid communication with the lithium extraction composite, wherein said lithium extraction composite comprises: (i) a porous support and (ii) particles of a lithium-selective sorbent material coated on at least one surface of the support, wherein said support has a porous planar membrane, porous fiber, or porous tubular shape; and
wherein said lithium-selective sorbent material has a framework structure represented by the following chemical formula:

$$\text{LiX:M1}_{x-y}\text{M2}_y(\text{OH})_3 \cdot n\text{H}_2\text{O} \tag{1}$$

wherein X is at least one anionic species selected from halide, nitrate, sulfate, carbonate, and bicarbonate; M1 is at least one oxophilic main group metal atom selected from aluminum, gallium, and indium; and M2 is at least one oxophilic transition metal atom, and/or at least one oxophilic main group metal atom selected from aluminum, gallium, indium, silicon, germanium, and tin, provided that M1 and M2 are different; x is at least 1 and up to 1.5; y is at least 0.1x and less than x; n is ≤4, and the species Li, X, M1, and M2 in Formula (1) are within a framework structure.

* * * * *